(12) United States Patent
Logan et al.

(10) Patent No.: US 7,709,113 B2
(45) Date of Patent: *May 4, 2010

(54) BIO-ELECTROCHEMICALLY ASSISTED MICROBIAL REACTOR THAT GENERATES HYDROGEN GAS AND METHODS OF GENERATING HYDROGEN GAS

(75) Inventors: Bruce Logan, State College, PA (US); Stephen Grot, Newark (DE); Thomas E. Mallouk, State College, PA (US); Hong Liu, Corvallis, OR (US)

(73) Assignees: The Penn State Research Foundation, University Park, PA (US); Ion Power, Inc., New Castle, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/360,708

(22) Filed: Jan. 27, 2009

(65) Prior Publication Data
US 2009/0159455 A1    Jun. 25, 2009

Related U.S. Application Data

(63) Continuation of application No. 11/180,454, filed on Jul. 13, 2005, now Pat. No. 7,491,453.
(60) Provisional application No. 60/588,022, filed on Jul. 14, 2004, provisional application No. 60/608,703, filed on Sep. 10, 2004.

(51) Int. Cl.
*H01M 8/16* (2006.01)

(52) U.S. Cl. .............. 429/2; 429/12; 429/13; 429/17; 429/19; 429/34; 429/38; 204/242; 204/252; 204/260; 204/263; 204/264; 204/266; 204/269; 204/270; 204/272; 204/275.1; 204/276; 204/278; 205/637; 205/638; 205/435; 435/297.1; 435/298.1; 435/300.1; 422/305

(58) Field of Classification Search .............. 429/2, 429/12, 13, 17, 19, 34, 38; 204/242, 252, 204/260, 263, 264, 266, 269, 270, 272, 275.1, 204/276, 278; 205/637, 638; 435/297.1, 435/298.1, 300.1; 422/305
See application file for complete search history.

(56) References Cited

U.S. PATENT DOCUMENTS 4,652,501 A    3/1987 Bennetto et al.
(Continued)

FOREIGN PATENT DOCUMENTS

WO    WO 9103079    3/1991
(Continued)

OTHER PUBLICATIONS

Oh, S. et al., Proton exchange membrane and electrode surface areas as factors that affect power generation in microbial fuel cells, *Applied Microbiology and Biotechnology*, 70:162-169, 2006.
(Continued)

*Primary Examiner*—Bruce F Bell
(74) *Attorney, Agent, or Firm*—Gifford, Krass, Sprinkle, Anderson & Citkowski, P.C.

(57) ABSTRACT

Systems and processes for producing hydrogen using bacteria are described. One detailed process for producing hydrogen uses a system for producing hydrogen as described herein, the system including a reactor. Anodophilic bacteria are disposed within the interior of the reactor and an organic material oxidizable by an oxidizing activity of the anodophilic bacteria is introduced and incubated under oxidizing reactions conditions such that electrons are produced and transferred to the anode. A power source is activated to increase a potential between the anode and the cathode, such that electrons and protons combine to produce hydrogen gas. In one system for producing hydrogen is provided which includes a reaction chamber having a wall defining an interior of the reactor and an exterior of the reaction chamber. An anode is provided which is at least partially contained within the interior of the reaction chamber and a cathode is also provided which is at least partially contained within the interior of the reaction chamber. The cathode is spaced apart at a distance in the range between 0.1-100 centimeters, inclusive, from the anode. A conductive conduit for electrons is provided which is in electrical communication with the anode and the cathode and a power source for enhancing an electrical potential between the anode and cathode is included which is in electrical communication at least with the cathode. A first channel defining a passage from the exterior of the reaction chamber to the interior of the reaction chamber is also included.

26 Claims, 7 Drawing Sheets

U.S. PATENT DOCUMENTS

| | | | |
|---|---|---|---|
| 4,891,404 | A | 1/1990 | Narayan et al. |
| 5,256,501 | A | 10/1993 | Hasvold et al. |
| 5,427,871 | A | 6/1995 | Garshol et al. |
| 5,683,558 | A | 11/1997 | Sieck et al. |
| 5,976,719 | A | 11/1999 | Kim et al. |
| 6,090,266 | A | 7/2000 | Roychowdhury |
| 6,217,822 | B1 | 4/2001 | Borglum |
| 6,887,692 | B2 | 5/2005 | Paterek |
| 7,491,453 | B2 * | 2/2009 | Logan et al. ............. 429/2 |
| 2002/0025469 | A1 | 2/2002 | Heller |
| 2004/0094406 | A1 | 5/2004 | Sawada |
| 2005/0095466 | A1 | 5/2005 | Minteer et al. |
| 2006/0011491 | A1 | 1/2006 | Logan et al. |
| 2006/0147763 | A1 | 7/2006 | Angenent et al. |
| 2006/0160200 | A1 | 7/2006 | Rathenow et al. |
| 2006/0172186 | A1 | 8/2006 | Tender |
| 2006/0234110 | A1 | 10/2006 | Bergel |
| 2007/0042480 | A1 | 2/2007 | Rozendal et al. |
| 2007/0062820 | A1 | 3/2007 | Smotkin |
| 2007/0172710 | A1 | 7/2007 | Kruesi |
| 2007/0259216 | A1 * | 11/2007 | Logan ............. 429/2 |
| 2007/0259217 | A1 | 11/2007 | Logan |
| 2008/0220292 | A1 | 9/2008 | Rabaey et al. |
| 2008/0251445 | A1 | 10/2008 | Kamleiter et al. |
| 2008/0277273 | A1 * | 11/2008 | Logan ............. 204/253 |
| 2008/0286624 | A1 | 11/2008 | Lovley et al. |
| 2008/0292912 | A1 | 11/2008 | Logan |
| 2009/0029198 | A1 | 1/2009 | Jin et al. |

FOREIGN PATENT DOCUMENTS

| | | |
|---|---|---|
| WO | WO-0139306 | 5/2001 |
| WO | WO-2004/015172 | 2/2004 |
| WO | WO-2005005981 | 1/2005 |
| WO | WO-2007/010313 | 1/2007 |
| WO | WO-2008/063843 | 5/2008 |
| WO | WO-2008/109962 | 9/2008 |

OTHER PUBLICATIONS

Logan, B. et al., Graphite Fiber Brush Anodes for Increased Power Production in Air Cathode Microbial Fuel Cells, *Environmental Science and Technology*, 41:3341-3346, 2007.

Oh, S. et al., Cathode Performance as a Factor in Electricity Generation in Microbial Fuel Cells, *Environmental Science and Technology*, 38:4900-4904, 2004.

Liu, H. et al., Power Generation in Fed-Batch Microbial Fuel Cells as a Function of Ionic Strength, Temperature, and Reactor Configuration, *Environmental Science and Technology*, 39:5488-5493, 2005.

Cheng, S. et al., Increased Power Generation in a Continuous Flow MFC with Adjective Flow through the Porous Anode and Reduced Electrode Spacing, *Environmental Science and Technology*, 40:2426-2432, 2006.

Logan, B. et al., Microbial Fuel Cells: Methodology and Technology, *Environmental Science and Technology*, 40:5181-5192, 2006.

Cheng, S. et al., Ammonia treatment of carbon cloth anodes to enhance power generation of microbial fuel cells, *Electrochemistry Communications*, 9:492-496, 2007.

Cheng, S. et al., Power Densities Using Different Cathode Catalysts (Pt and CoTMPP) and Polymer Binders (Nafion and PTFE) in Single Chamber Microbial Fuel Cells, *Environmental Science and Technology*, 40:364-369, 2006.

Cheng, S. et al., Increased performance of single-chamber microbial fuel cells using an improved cathode structure, *Electrochemistry Communications*, 8:489-494, 2006.

Liu, H. et al., Electrochemically Assisted Microbial Production of Hydrogen from Acetate, *Environmental Science and Technology*, 39:4317-4320, 2006.

Liu, H. et al., Electricity Generation Using an Air-Cathode Single Chamber Microbial Fuel Cell in the Presence and Absence of a Proton Exchange Membrane, Environmental Science and Technology, 38:4040-4046, 2004.

Liu H. et al., Production of Electricity during Wastewater Treatment Using a Single Chamber Microbial Fuel Cell, Environmental Science and Technology, 38:2281-2285, 2004.

Liu, H. et al., Production of Electricity from Acetate or Butyrate Using a Single-Chamber Microbial Fuel Cell, Environmental Science and Technology, 39: 658-662, 2004.

Kim, J. et al., Power Generation Using Different Cation, Anion, and Ultrafiltration Membranes in Microbial Fuel Cells, Environmental Science and Technology, 41: 1004-1009, 2007.

Zuo, Y. et al., Electricity Production from Steam-Exploded Corn Stover Biomass, Energy and Fuels, 20:1716-1721, 2006.

Kim, J. et al., Evaluation of procedures to acclimate a microbial fuel cell for electricity production, *Applied Microbiology and Biotechnology*, 68:23-30, 2005.

Logan, B. et al., Electricity-producing bacterial communities in microbial fuel cells, *TRENDS in Microbiology*, 14: 512-518, 2006.

Chiou, C. et al., Contaminant Sorption by Soil and Bed Sediment, U.S. Department of the Interior, U.S. Geological Survey: Reston, VA, 2000.

Rabaey, K. et al., Microbial Fuel Cells for Sulfide Removal, *Environmental Science and Technology*, 40:5218-5224, 2006.

Reimers, C. et al., Harvesting Energy from the Marine Sediment-Water Interface, *Environmental Science and Technology*, 35:192-195, 2001.

Finkelstein, D. et al., Effect of Electrode Potential on Electrode-Reducing Microbiota, *Environmental Science and Technology*, 40:6990-6995, 2006.

He, Z. et al., An Upflow Microbial Fuel Cell with an Interior Cathode: Assessment of the Internal Resistance by Impedance Spectroscopy, *Environmental Science and Technology*, 40:5212-5217, 2006.

Cai, M. et al., Enhanced Biohydrogen Production from Sewage Sludge with Alkaline Pretreatment, *Environmental Science and Technology*, 38:3195-3202, 2004.

Hasvold, O. et al., Sea-water battery for subsea control systems, *Journal of Power Sources*, 65:253-261, 1997.

Hasvold, O. et al., Electrochemical power sources for unmanned underwater vehicles used in deep sea survey operations, *Journal of Power Sources*, 96: 252-258, 2001.

Cooper, K. et al., Electrical test methods for on-line fuel cell ohmic resistance measurement, *Journal of Power Sources*, 160:1088-1095, 2006.

Tender, L. et al., Harnessing microbially generated power on the seafloor, *Nature Biotechnology*, 20:821-825, 2002.

Chaudhuri, S. et al., Electricity generation by direct oxidation of glucose in mediatorless microbial fuel cells, *Nature Biotechnology*, 21:1229-1232, 2003.

Lovley, D., Microbial Energizers: Fuel Cells That Keep on Going, *Microbe*, 1:323-329, 2006.

Lowy, D. et al., Harvesting energy from the marine sediment—water interface II Kinetic activity of anode materials, *Biosensors and Bioelectronics*, 21:2058-2063, 2006.

Brennan, R. et al., Chitin and corncobs as electron donor sources for the reductive dechlorination of tetrachloroethene, Water Research, 40:2125-2134, 2006.

Niessen, J. et al., Fluorinated polyanilines as superior materials for electrocatalytic anodes in bacterial fuel cells, *Electrochemistry Communications*, 6:571-575, 2004.

Park, D. et al., Improved Fuel Cell and Electrode Designs for Producing Electricity from Microbial Degradation, *Biotechnology and Bioengineering*, 81:348-355, 2003.

Kim, N. et al., Effect of Initial Carbon Sources on the Performance of Microbial Fuel Cells Containing Proteus vulgaris, *Biotechnology and Bioengineering*, 70:109-114, 2000.

Bond, D. et al., Electrode-Reducing Microorganisms that Harvest Energy from Marine Sediments, Science, 295:483-485, 2002.

Bond, D. et al., Electricity Production by Geobacter sulfurreducens Attached to Electrodes, *Applied and Environmental Microbiology*, 69:1548-1555, 2003.

Park, D. et al., Electricity Generation in Microbial Fuel Cells Using Neutral Red as an Electronophore, *Applied and Environmental Microbiology*, 66:1292-1297, 2000.

Lovley, D. et al., Anaerobic Oxidation of Toluene, Phenol, and p-Cresol by the Dissimilatory Iron-Reducing Organism, GS-15, *Applied and Environmental Microbiology*, 56:1858-1864, 1990.

Rabaey, K. et al., A microbial fuel cell capable of converting glucose to electricity at high rate and efficiency, *Biotechnology Letters*, 25:1531-1535, 2003.

Park, H. et al., A Novel Electrochemically Active and Fe(III)-reducing Bacterium Phylogenetically Related to Clostridium butyricum Isolated from a Microbial Fuel Cell, *Anaerobe*, 7:297-306, 2001.

Park, D. et al., Impact of electrode composition on electricity generation in a single-compartment fuel cell using *Shewanella putrefaciens*, Applied Microbiology and Technology, 59:58-61, 2002.

Raz, S. et al., Supported mixed-gas fuel cells, Solid State Ionics, 149:335-341, 2002.

Reimers, C. et al., Microbial Fuel Cell Energy from an Ocean Cold Seep, Geobiology, 4:123-136, 2006.

Kim, H. et al., A mediator-less microbial fuel cell using a metal reducing bacterium, *Shewanella putrefaciens*, Enzyme and Microbial Technology, 30:145-152, 2002.

Svitil, A. et al., A chitin-binding domain in a marine bacterial chitinase and other microbial chitinases: implications for the ecology and evolution of 1, 4-β-glycanases, Microbiology, 144:1299-1308, 1998.

Lovley, D. et al., Novel Mode of Microbial Energy Metabolism: Organic Carbon Oxidation Coupled to Dissimilatory Reduction of Iron or Manganese, *Applied and Environmental Microbiology*, 54:1472-1480, 1988.

Allen, R. et al., Microbial fuel-cells: electricity production from carbohydrates, *Applied biochemistry and biotechnology*, 39:40:27-40, 1993.

Logan, B., Extracting Hydrogen and Electricity from Renewable Resources, *Environmental Science and Technology*, 38:160A-166A, 2004.

Grant, P., Hydrogen lifts off—with a heavy load, *Nature*, 424:129-130, 2003.

Gross, R. et al., Progress in renewable energy, *Environment International*, 29:105-122, 2003.

Nath, K. et al., Improvement of fermentative hydrogen production: various approaches, *Applied Microbiology and Biotechnology*, 65:520-529, 2004.

Miyake, J. et al., Biotechnological hydrogen production: research for efficient light energy conversion, *Journal of Biotechnology*, 70:89-101, 1999.

Woodward, J. et al., Enzymatic production of biohydrogen, *Nature*, 405:1014-1015, 2000.

Cheng, H. et al., Intensification of Water Electrolysis in a Centrifugal Field, *Journal of the Electrochemical Society*, 149:D172-D177, 2002.

Logan, B. et al., Biological Hydrogen Production Measured in Batch Anaerobic Respirometers, *Environmental Science and Technology*, 36:2530-2535, 2002.

Min, B. et al., Continuous Electricity Generation from Domestic Wastewater and Organic Substrates in a Flat Plate Microbial Fuel Cell, *Environmental Science and Technology*, 38:5809-5814, 2004.

Logan, B. et al., Electricity generation from cysteine in a microbial fuel cell, *Water Research*, 39:942-952, 2005.

Cheng, S. et al., Optimization of Air Cathode used in One-Chamber Microbial Fuel Cells, Extended Abstract, *Proc. 228th American Chemical Society Annual Meeting*, 2004.

Angenent, L., Production of bioenergy and biochemicals from industrial and agricultural wastewater, *TRENDS in Biotechnology*, 22:477-485, 2004.

Zuo, Y. et al., Tubular Membrane Cathodes for Scalable Power Generation in Microbial Fuel Cells, *Environmental Science and Technology*, 41:3347-3353, 2007.

He, Z., S.D. Minteer, and L.T. Angenent. "Electricity Generation from Artificial Wasterwater Using an Upflow Microbial Fuel Cell." Environmental Science and Technology 2005, vol. 39, p. 5262-5267.

Yu, E.H., Cheng, S., Scott, K., Logan, B.E., Microbial fuel performance with non-Pt cathode catalysts, J. Power Sources, 171(2):275-281 (2007).

Cheng, S., Logan, B.E., Sustainable and efficient biohydrogen production via electrohydrogenesis, PNAS, 104(47):18871-18873 (2007).

Call, D., Logan, B.E., Hydrogen production in a single chamber microbial electrolysis cell lacking a membrane, Environ. Sci. Technol., 42(9):3401-3406 (2008).

Xing, D., Zuo, Y., Cheng, S., Regan, J.M., Logan, B.E., Electricity generation by *Rhodopseudomonas palustris*, DX-1, Environ. Sci. Technol., 42:4146-4151, 2008.

Chen, Weifang, Cannon, Fred S., Rangel-Mendez, Jose R., Ammonia-Tailoring of GAC to enhance perchlorate removal. I: Characterization of $NH_3$ thermally tailored GACs, Carbon 43 (2005) 573-580.

Chen, Weifang, Cannon, Fred S., Rangel-Mendez, Jose R., Ammonia-tailoring of GAC to enhance perchlorate removal. II: Perchlorate adsorption, Carbon 43 (2005) 581-590.

Min, B., "Perchlorate remediation using packed-bed bioreactors and electricity generation in microbial fuel cells (MFCs)," Thesis submitted to The Pennsylvania State University, The Graduate School, Department of Civil and Environmental Engineering, May 2005.

Benemann, J. et al., Novel Photobiological Hydrogen Production Process, *Proceedings of the 13th International Congress on Photosynthesis* (Montreal, Canada) 2004 Eds, Van der Est and Bruce, p. 878-880.

Rezaei, F., Substrate-Enhanced Microbial Fuel Cells for Improved Remote Power Generation from Sediment-Based Systems, *Environmental Science & Technology*, 41(11):4053-58, 2007.

Ditzig, J., Production of hydrogen from domestic wastewater using a bioelectrically assisted microbial reactor (BEAMR), *International Journal of Hydrogen Energy*, 32:2296-2304, 2007.

Ringeisen, B., A miniature microbial fuel cell operating with an aerobic anode chamber, *Journal of Power Sources*, 165: 591-597, 2007.

Ren, Z., Characterization of the cellulolytic and hydrogen-producing activities of six mesophilic *Clostridium* species, *Journal of Applied Microbiology*, 103:2258-2266, 2007.

Biffinger, J., Engineering Microbial Fuels Cells: Recent Patents and New Directions, *Recent Patents on Biotechnology*, 2:150-155, 2008.

Cord-Ruwisch, R., Growth of *Geobacter sulfurreducens* with Acetate in Syntrophic Cooperation with Hydrogen-Oxidizing Anaerobic Partners, *Applied and Environmental Microbiology*, 64(6): 2232-2236, Jun. 1998.

Ren, Z., Electricity Production from Cellulose in a Microbial Fuel Cell Using a Defined Binary Culture, *Environmental Science & Technology*, 41(13): 4781-4786, 2007.

Logan, B.E., Transport of Chemicals Present as Pure Phases, p. 399-405 in Environmental Transport Processes, John Wiley & Sons. 1999.

Dumas, C., et al., Marine microbial fuel cell: Use of stainless steel electrodes as anode and cathode materials, *Electrochimica Acta*, 53:468-473, 2007.

Bergel, A., Catalysis of oxygen reduction in PEM fuel cell by seawater biofilm, *Electrochemistry Communications*, 7:900-904, 2005.

Zuo, Y. et al., Ion Exchange Membrane Cathodes for Scalable Microbial Fuel Cells, *Environmental Science & Technology*, 42(18): 6967-6972, 2008.

\* cited by examiner

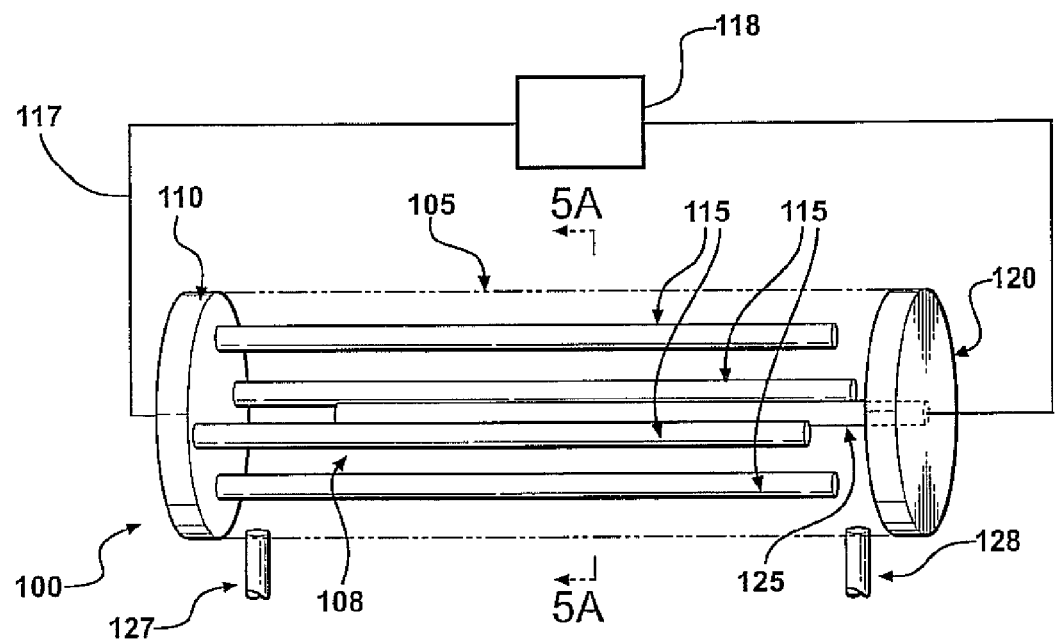
FIG - 5
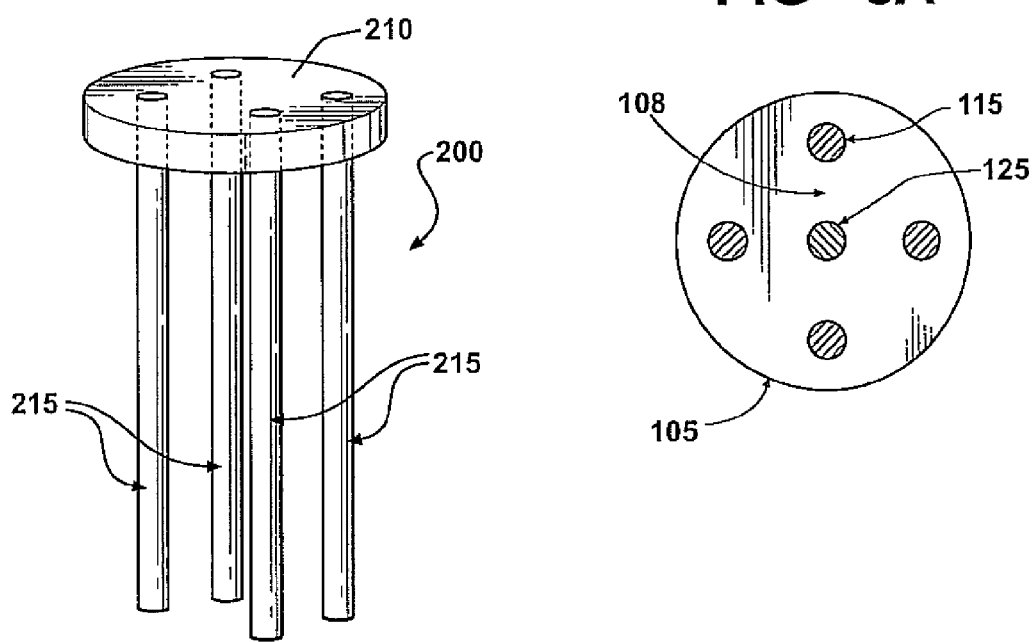
FIG - 6A
FIG - 5A

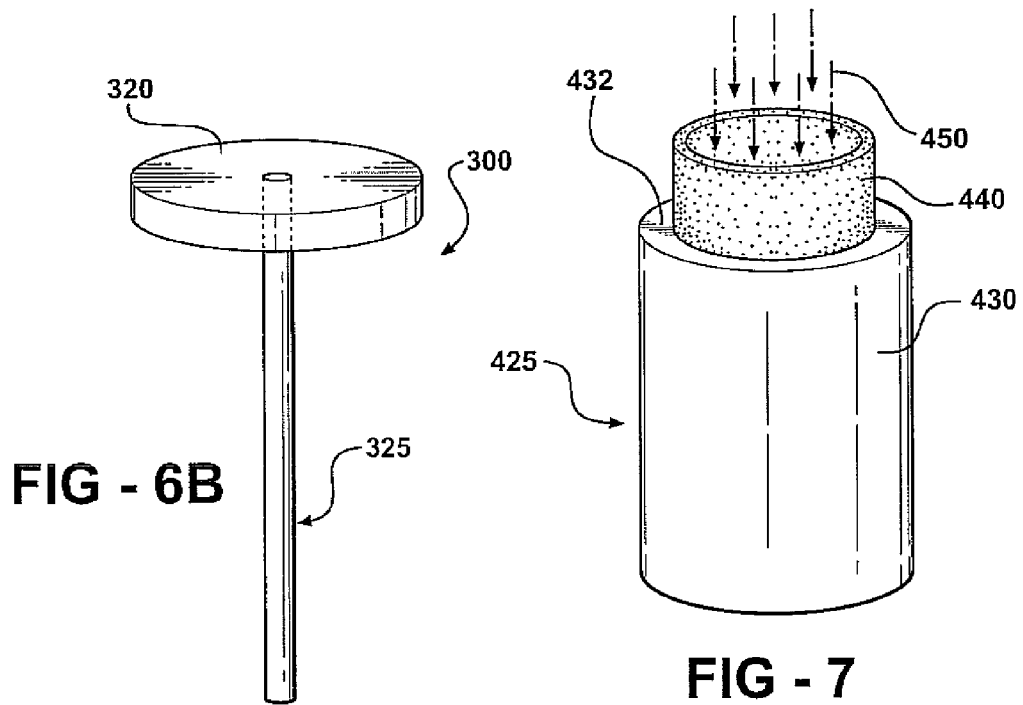
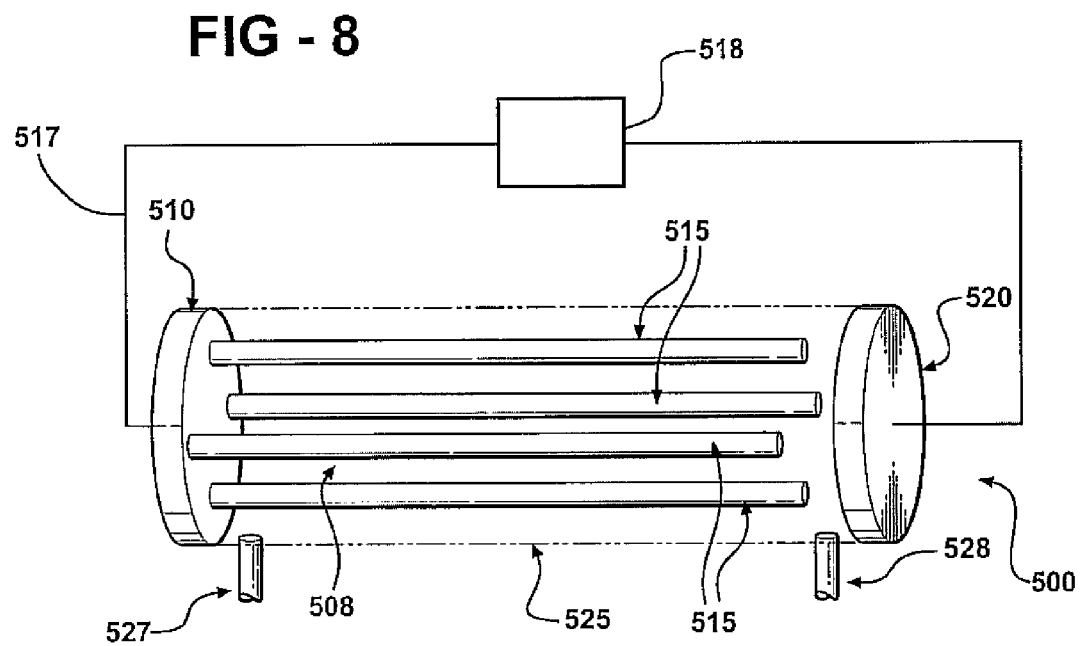

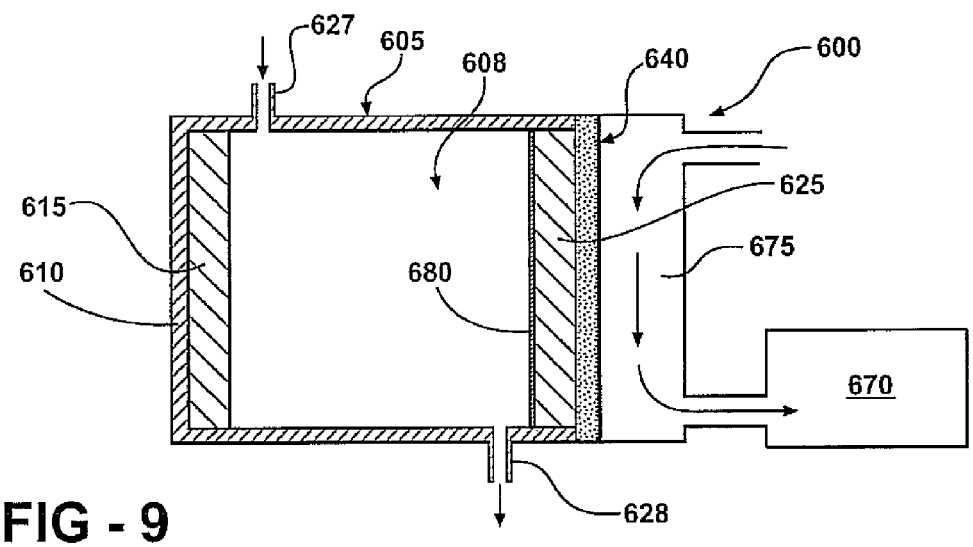
FIG - 9
FIG - 10
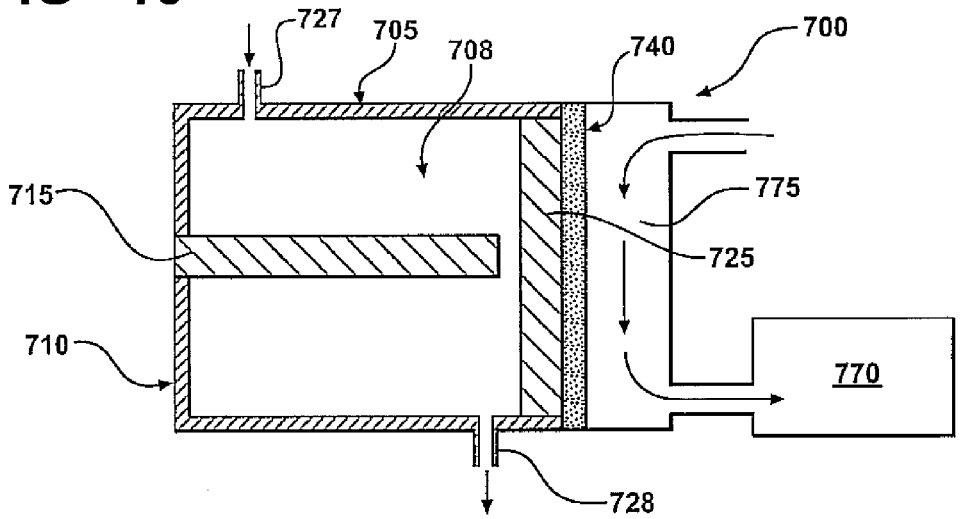
FIG - 11
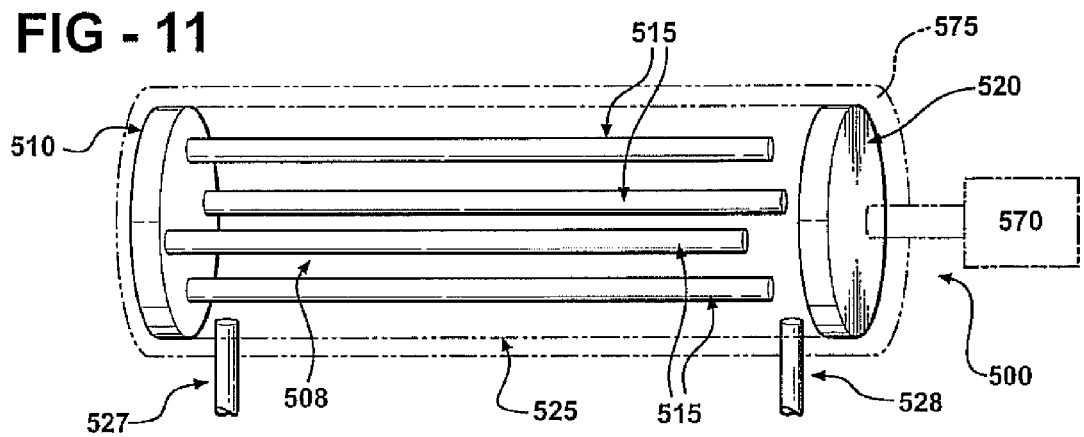

BIO-ELECTROCHEMICALLY ASSISTED MICROBIAL REACTOR THAT GENERATES HYDROGEN GAS AND METHODS OF GENERATING HYDROGEN GAS

REFERENCE TO RELATED APPLICATIONS

This application is a continuation of U.S. patent application Ser. No. 11/180,454, filed Jul. 13, 2005, which claims priority of U.S. Provisional Patent Application Ser. Nos. 60/588,022, filed Jul. 14, 2004, and 60/608,703, filed Sep. 10, 2004, the entire content of each application being incorporated herein by reference.

GOVERNMENT SUPPORT

Research carried out in connection with this invention was supported in part by National Science Foundation grant BES-0401885 and United States Department of Agriculture grant 68-3A75-3-150. Accordingly, the United States government may have certain rights in the invention.

FIELD OF THE INVENTION

The invention relates to systems and processes for producing hydrogen gas. In particular, the invention relates to bio-electrochemically assisted microbial reactor systems and processes for producing hydrogen gas.

BACKGROUND OF THE INVENTION

The global interest in a hydrogen economy has been stimulated by the promise of clean energy production using hydrogen in fuel cells. A reduction in $CO_2$ emissions, however, will require sustainable hydrogen production based on renewable energy using solar, wind and biomass sources. Currently about half of all the hydrogen produced is derived from natural gas, with the balance produced primarily using other fossil fuels, including heavy oils, naphtha and coal. Only 4% is generated from water using electricity derived from a variety of sources (1-3).

Hydrogen can be produced from certain forms of biomass by biological fermentation (4), but yields are low. The maximum hydrogen production from fermentation, assuming only acetate or butyrate is produced from glucose, is

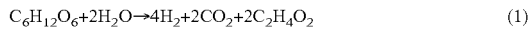
(1)

(2)

Four mol-$H_2$/mol-glucose could be obtained if only acetate is produced, but only 2 mol/mol if butyrate is the sole end product. Current fermentation techniques produce a maximum of 2-3 mol-$H_2$/mol-glucose. Thus, most of the remaining organic matter is essentially wasted as a mixture of primarily acetic and butyric acids, despite a stoichiometric potential of 12 mol-$H_2$/mol-glucose (1). The greatest hydrogen yield theoretically possible using microorganisms (without an external source of energy) is therefore 4 mol-$H_2$/mol-glucose based on production of acetic acid. Higher yields can be achieved using a photobiological process and supplemental light, or using pure enzymes, but neither of these methods so far show promise for economical production of hydrogen (5-7).

Thus, there is a continuing need for improved methods and apparatus for hydrogen production.

SUMMARY OF THE INVENTION

A system for producing hydrogen is provided which includes a reaction chamber having a wall defining an interior of the reactor and an exterior of the reaction chamber. An anode is provided which is at least partially contained within the interior of the reaction chamber and a cathode is also provided which is at least partially contained within the interior of the reaction chamber. The cathode is spaced apart at a distance in the range between 0.1-100 centimeters, inclusive, from the anode. A conductive conduit for electrons is provided which is in electrical communication with the anode and the cathode and a power source for enhancing an electrical potential between the anode and cathode is included which is in electrical communication at least with the cathode. A first channel defining a passage from the exterior of the reaction chamber to the interior of the reaction chamber is included.

Preferably, the anode and the cathode are both electrically conductive. Optionally, the cathode is an air cathode.

Further optionally, the cathode is spaced apart from the anode at a distance in the range between 0.25-5 centimeters and further optionally in the range between 0.5-2 centimeters.

In a preferred embodiment, a cathode protective layer is present in contact with a surface of the cathode in the interior of the reaction chamber to protect the cathode from deterioration and to inhibit growth of bacteria directly on the cathode.

Optionally, a proton exchange membrane is interposed between the anode and the cathode. In a further option, a filter is interposed between the anode and the cathode, preferably the filter is permeable to protons and impermeable to bacteria.

In a preferred option, the anode is porous to a liquid containing an organic substrate for anodophilic bacteria. In such an embodiment, optionally, a first channel, the anode and the cathode are positioned such that a liquid containing an organic substrate for anodophilic bacteria which is introduced into the interior of the reaction chamber through the channel passes through the anode prior to reaching the cathode. Such an arrangement is advantageous in having a low internal resistance.

An anode and cathode may have any of various shapes and dimensions and are positioned in various ways in relation to each other. In one embodiment, the anode and the cathode each have a longest dimension, and the anode and the cathode are positioned such that the longest dimension of the anode is parallel to the longest dimension of the cathode. In another option, the anode and the cathode each have a longest dimension, and the anode and the cathode are positioned such that the longest dimension of the anode is perpendicular to the longest dimension of the cathode. Further optionally, the anode and the cathode each have a longest dimension, and the anode and the cathode are positioned such that the longest dimension of the anode is perpendicular to the longest dimension of the cathode. In addition, the anode and the cathode may be positioned such that the longest dimension of the anode is at an angle in the range between 0 and 180 degrees with respect to the longest dimension of the cathode.

As noted, a first channel is included defining a passage from the exterior of the reaction chamber to the interior. More than one channel may be included to allow and/or regulate flow of materials into and out of the reaction chamber. For example, a channel may be included to allow for outflow of a gas generated at the cathode. Further, a channel may be included to allow for outflow of a gas generated at the anode. Further channels may be included to allow flow of a liquid containing an organic material oxidizable by anodophilic bacteria into the chamber and optionally, outflow of liquid from which the organic material has been depleted due to oxidation by bacteria. A regulator device, such as a valve, may be included to further regulate flow of materials into and out of the reaction chamber.

Optionally, an inventive system is provided which includes more than one anode and/or more than one cathode. For example, from 1-100 additional anodes and/or 1-100 additional cathodes may be provided.

In one embodiment, the wall of the reaction chamber includes a support structure for supporting an anode or cathode. Preferably, the support for a cathode is porous to hydrogen.

In a further embodiment, the wall of the reaction chamber includes two or more portions such as a structural portion and an electrode portion. A structural portion provides structural support for forming and maintaining the shape of the reaction chamber, as in a conventional wall. An electrode portion of a wall may provide structural support for the reaction chamber and in addition has a functional role in a process carried out in an inventive system. In such an embodiment, the structural portion and electrode portion combine to form a wall defining the interior of the reaction chamber. In a specific embodiment, the electrode portion of the wall includes the cathode. Further, a support structure for supporting an anode or cathode may be included in an electrode portion of the wall. Such a support structure may further provide structural support for forming and maintaining the shape of the reaction chamber A hydrogen collection system may be included in an inventive system. For instance, a hydrogen collection system may include a container for collection of hydrogen from the cathode. A collection system may further include a conduit for passage of hydrogen. The conduit and/or container may be in gas flow communication with a channel provided for outflow of hydrogen gas from the reaction chamber. Typically, the conduit and/or container are in gas flow communication with the cathode, particularly where the cathode is an air cathode.

In one option the anodes included in an inventive system have a total surface area and the interior of the reaction chamber has a total volume, and the ratio of the total surface area of tile anode or anodes to the total volume of the interior of the reaction chamber is in the range of 1000:1-1:1 square meters per cubic meter, inclusive, or preferably in the range of 500:1-50:1, inclusive.

In another option, a cathode diffusion layer is disposed on the outer surface of the cathode.

Preferably such a cathode diffusion layer includes a hydrophobic hydrogen permeable polymer material, allowing hydrogen to pass and inhibiting leaks.

Further optionally, a cathode protective layer is disposed in the interior of the reaction chamber but not in contact with the cathode such that a material flowing from an anode to a cathode passes through the CPL.

A highly preferred cathode protective layer includes an anion exchange material. Further preferred is a CPL in the form of an anion exchange membrane.

A process for producing hydrogen, including providing a system for producing hydrogen as described herein, the system comprising a reactor having an interior; providing anodophilic bacteria disposed within the interior of the reactor; introducing an organic material oxidizable by an oxidizing activity of the anodophilic bacteria; incubating the organic material oxidizable by the anodophilic bacteria under oxidizing reactions conditions such that electrons are produced and transferred to the anode; activating a power source to increase a potential between the anode and the cathode, such that electrons and protons combine to produce hydrogen gas.

Optionally and preferably, the anodophilic bacteria are disposed on the anode. Further preferred is an embodiment in which the material to be oxidized is a component of wastewater. Preferably, the activation of the power source includes application of a voltage in the range of 25-1600 millivolts. Further optionally included is a step of incubating the organic material oxidizable by the anodophilic bacteria under oxidizing reactions conditions which includes incubation at an ambient temperature in the range of 15-24° C., inclusive. In a further option, incubating the organic material oxidizable by the anodophilic bacteria under oxidizing reactions conditions includes incubation in a medium having an ionic strength in the range of 50-500 millimolar, preferably 100-400 millimolar. Also optionally, an inventive process includes incubating the organic material oxidizable by the anodophilic bacteria under oxidizing reaction conditions including maintenance of substantially anaerobic conditions.

BRIEF DESCRIPTION OF THE DRAWINGS

FIG. 5 is a drawing illustrating an apparatus of the invention in which anodes and a cathode extend from supporting walls on opposed ends of a reaction chamber;

FIG. 5A is a drawing illustrating a cross section of the apparatus shown in FIG. 5 illustrating spacing between anodes and the central cathode;

FIG. 6A is a drawing illustrating a portion of a reaction chamber including a support wall for multiple anodes;

FIG. 6B is a drawing illustrating a portion of a reaction chamber including a support wall for a cathode;

FIG. 7 is a drawing illustrating a portion of a cathode assembly;

FIG. 8 is a drawing illustrating a tubular configuration of reaction chamber in which anodes extend from a supporting wall on an end of a reaction chamber and a cathode forms a side wall of the reaction chamber;

FIG. 9 is a drawing illustrating an inventive system in which a longest dimension of an anode and a cathode are oriented parallel with respect to each other;

FIG. 10 is a drawing illustrating an inventive system in which a longest dimension of an anode and a cathode are oriented perpendicularly with respect to each other;

FIG. 11 is a drawing illustrating an inventive system having a side wall cathode;

DETAILED DESCRIPTION OF THE INVENTION

Figure 1:
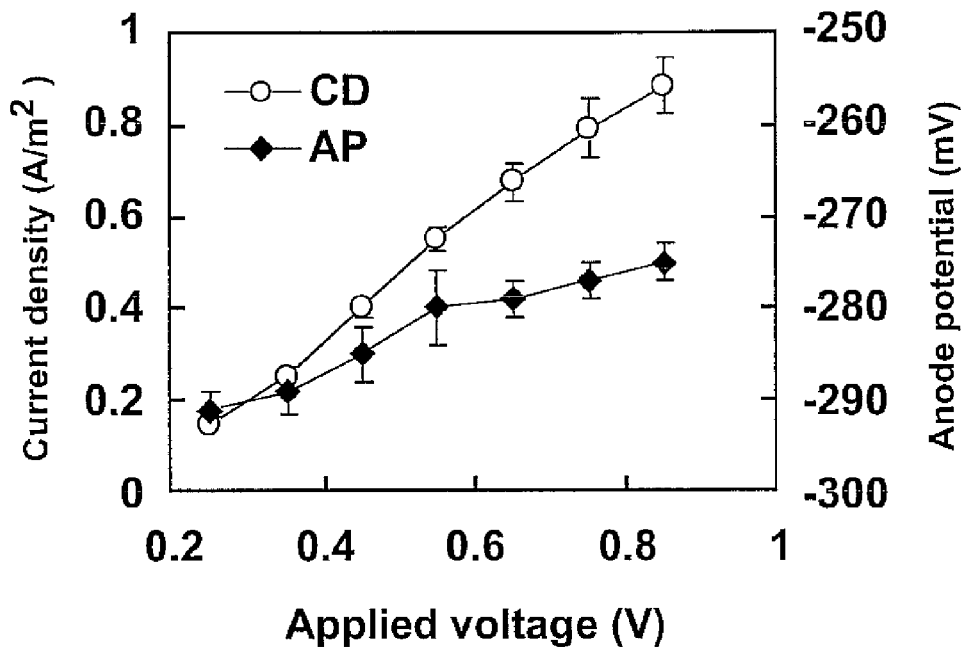
FIG. 1 is a graph showing increased current density (CD) and anode potential (AP) with the applied voltage in an inventive hydrogen generating system.

Inventive methods and systems for producing hydrogen are described herein which are based on a completely new approach to biohydrogen production. In the present invention, hydrogen is produced by employing a reactor that uses bacteria as a biocatalyst to oxidize organic matter, under anaerobic conditions, and directly generating hydrogen at the cathode by applying an additional potential at the cathode to convert protons to hydrogen. The present invention allows for the generation of hydrogen at relatively low applied potentials; hence, it will have significant applications in a variety of power systems since it provides a significant cost savings in the large scale generation of hydrogen. Exemplary uses for inventive processes and systems include fuel cells, commercial chemical reactions, food processing and the like.

Particularly key in one embodiment of the invention is to keep bacteria in the reactor growing under anaerobic conditions and separated from the counter electrode. By separating the bacteria from oxygen using a two electrode system, the bacteria can transfer electrons through a conductive material that will shuttle the electrons to the counter electrode at a distant location. Thus, by separating the bacteria from the oxygen, it is possible to generate an electric potential and therefore electricity.

An embodiment of an inventive system is a completely anaerobic system to generate hydrogen at the cathode by providing a small added voltage to the circuit. This approach to electrochemically assist hydrogen production is based on separating the two electrodes into half cell reactions. The potential of the anode is set by the oxidation of the substrate. Thus, the anode side of an embodiment of an inventive system operates similarly to that in a microbial fuel cell (MFC): bacteria oxidize an organic compound completely to $CO_2$ and transfer electrons to the anode. The half reaction potential measured at the anode in an embodiment of an inventive system tests as −480 mV (Ag/AgCl) or −285 mV (NHE) (reduction).

In contrast, cathode operation in an embodiment of an inventive anaerobic system is significantly altered from that in a standard MFC. By electrochemically augmenting the cathode potential in a MFC circuit it is possible to directly produce hydrogen from protons and electrons produced by the bacteria. This approach greatly reduces the energy needed to make hydrogen directly from organic matter compared to that required for hydrogen production from water via electrolysis. In a typical MFC, the open circuit potential of the anode is ~−300 mV (15, 16). If hydrogen is produced at the cathode, the half reactions occurring at the anode and cathode, with acetate oxidized at the anode, are:

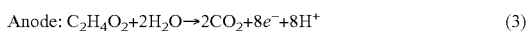

Anode: $C_2H_4O_2 + 2H_2O \rightarrow 2CO_2 + 8e^- + 8H^+$ (3)

Cathode: $8H^+ + 8e^- \rightarrow 4H_2$ (4)

Producing hydrogen at the cathode therefore requires a standard potential of only $E^0 = -410$ mV(NHE) at pH 7.0 (17), and so hydrogen can theoretically be produced at the cathode by applying a circuit voltage greater than 110 mV (i.e. 410 mV−300 mV). This voltage is substantially lower than that needed for hydrogen derived from the electrolysis of water, which is theoretically 1210 mV at neutral pH. In practice, 1800-2000 mV are needed for water hydrolysis (under alkaline solution conditions) due to overpotential at the electrodes (18). Thus, by deriving the protons and electrons from organic matter instead of water, hydrogen is generated at a low voltage using a type of MFC device that does not require oxygen, The use of an anaerobic process increases the Coulombic efficiency of the MFC process using mixed cultures as oxygen diffusion through the cathode is avoided (15).

The advantages of an inventive bioelectrochemically assisted system overproduction of hydrogen using conventional water electrolysis and non-renewable sources of electricity are multifold, particularly when the possibilities for hydrogen production from waste biomass sources are considered. For example, the microbial oxidation of the organic matter provides a renewable source of energy for hydrogen production, and overall greatly reduces energy needed to produce hydrogen compared to using electricity produced by other means. The electricity energy need using an embodiment of an inventive method is as low as 0.6 kwh/m³-$H_2$ (assuming an overall added potential of 250 mV), corresponding to an energy use of 0.2 mol hydrogen energy (121 kJ/g) per mole of hydrogen produced, while in other embodiment the requirements may be even lower. This is much lower than the typical energy requirement of 4.5-5 kwh/m³ (or 1.5-1.7 mol hydrogen energy per mole of hydrogen produced) for water electrolysis. Further, precious metal catalysts needed at the anode for water electrolyzer systems are completely replaced by self sustaining microbial biocatalysts in a preferred embodiment of an inventive system.

A significant challenge of producing electricity with a microbial fuel cell is overcome by producing hydrogen. Oxygen diffusion from the air fed cathode of the microbial fuel cell currently limits achieving anaerobic conditions of the anode which is important for optimal growth of bacteria that can produce electricity in a MFC. In this system, oxygen is eliminated from the reactor.

In addition, no PEM is needed. A system without a PEM demonstrates increased power output in a microbial fuel cell. In a conventional MFC system, a drawback in eliminating the PEM is that Coulombic efficiency drops due to increased oxygen diffusion from the cathode. In contrast, in an inventive anaerobic system this problem is eliminated.

Biological fermentation processes are inefficient since they achieve conversion rates of only 2-3 moles of hydrogen per mole of glucose, despite a theoretical potential of 12 mol/mol. In order to achieve a more efficient system for generation of hydrogen gas, the present invention is directed towards processes and systems using microbial organisms to metabolize organic material. An inventive system and process may be used as a supplement to a conventional biohydrogen reactor by further processing the effluent from the biohydrogen reactor. Alternatively, an inventive process and system may be used independently to generate hydrogen.

An inventive system for generating hydrogen gas includes a reaction chamber for housing components involved in a hydrogen generating reaction. A reaction chamber includes an anode and a cathode which are spaced apart such that a potential exists between them. Both the anode and cathode include at least a portion which is in an interior portion of the reaction chamber.

For example, a preferred embodiment of an inventive system includes a reaction chamber, the chamber having an exterior surface and an interior volume, an anode in contact with the reaction chamber, a portion of the anode disposed in the interior volume of the reaction chamber, a proton permeable cathode disposed in contact with the reaction chamber, a portion of the cathode disposed in the interior volume of the reaction chamber and spaced apart from the portion of the anode disposed in the interior volume of the reaction chamber, an electrical connection between the anode and the cathode, and a power source for enhancing the potential between the anode and cathode. A collection portion is optionally included.

In further detail, an embodiment of a system for producing hydrogen is provided which includes a reaction chamber having a wall defining an interior of the reactor and an exterior of the reaction chamber. An anode is provided which is at least partially contained within the interior of the reaction chamber and a cathode is also provided which is at least partially contained within the interior of the reaction chamber. In a preferred embodiment, the cathode is spaced apart at a distance in the range between 0.1-100 centimeters, inclusive, from the anode and even more preferably the anode is closer to the cathode as detailed further below.

A conductive conduit for electrons is provided which provides an electrical connection between an anode and a cathode. Thus, electrons produced by microbial oxidation of an organic oxidizable substance may be transferred from an anode to a cathode via such a conduit. Exemplary conduits include an electron conductive material such as a metal, conductive polymer, or carbon. The conduit may be in any convenient form, such as a wire.

A power source for enhancing an electrical potential between the anode and cathode is included. A power source suitable for use in an inventive system illustratively includes a DC power source and an electrochemical cell such as a battery or capacitor.

In one preferred option, a power supply is an electricity producing microbial fuel cell.

An electricity producing microbial fuel cell includes an anode and cathode, anodophiles disposed on the anode which oxidize an organic substance producing electrons and protons. Microbial fuel cells work through the action of these bacteria which can pass electrons to an anode, the negative electrode of a fuel cell. The electrons flow from the anode through a wire, producing a current, to a cathode, the positive electrode of a fuel cell, where they combine with hydrogen ions (protons) and oxygen to form water. The power produced by such a fuel cell can be used as a power supply in an inventive system, for instance, by connecting electrically conductive conduits between the electrodes of the electricity producing microbial cell and the hydrogen producing microbial cell.

A first channel defining a passage from the exterior of the reaction chamber to the interior of the reaction chamber is included providing a passageway for various substances, including an oxidizable organic material for oxidation by bacteria, and including gases produced in the reaction chamber, including those produced at an anode or cathode.

An anode and a cathode are provided, both of which preferably include an electrically conductive material. Exemplary conductive materials included in an anode are preferably carbon as a carbon paper, carbon cloth, carbon wool, graphite, a conductive polymer, and combinations of these. Typically, an anode provides a surface for attachment and growth of anodophilic bacteria and therefore an anode is made of material compatible with bacterial growth and maintenance.

A cathode included in an inventive system may be configured to be immersed in liquid or as a gas cathode, having a surface exposed to a gas. A cathode preferably includes an electron conductive material. Materials included in a cathode included in an inventive system illustratively include carbon cloth, carbon paper, carbon wool, a conductive metal, a conductive polymer and combinations thereof. Preferably, a cathode included in an inventive system includes a catalyst metal, such as a noble. Suitable catalyst metal illustratively include platinum, nickel, copper, tin, iron, palladium, cobalt, tungsten, and alloys of such metals, for efficient production of hydrogen. While a catalyst metal such as platinum is included in a cathode in one embodiment of an inventive system, the platinum content may be reduced, for example to as little as 0.1 mg/cm$^2$ without affecting energy production (23).

Optionally, and preferably in some embodiments, the cathode is a gas cathode

In a particularly preferred embodiment, an inventive reactor is configured so that an anode and cathode are close to each other. It has been found that power output in an MFC is substantially increased when an anode and cathode are positioned close to each other and it is believed that hydrogen production is similarly influenced by electrode spacing. For example, in an electricity generating MFC, power is increased by a factor of 1.4, achieving 567 mW/m$^2$ with glucose as a substrate, where the distance between an anode and cathode is one centimeter, (500 mg/L, $R_{ex}$=1000Ω). Without wishing to be bound by theoretical considerations, it is believed that the increase in power is due to a decrease in the internal resistance of the microbial fuel cell. The combined effect of the internal and external resistance on power density can be evaluated using Ohm's law, considering that the internal and external resistances are analogous to two resistors in series. The current is $$I = \frac{E}{R_{int} + R_{ex}} \quad (5)$$

where E is the electromotive force. The power density is $$P = \frac{I^2 R_{ex}}{A} \quad (6)$$

where A is the anode surface area. Combining these equations, the power density can be expressed as a function of both internal and external resistances as $$P = \frac{E^2 R_{ex}}{A(R_{int} + R_{ex})^2} \quad (7)$$

A decrease in the internal resistance, produced by changing the electrode spacing, therefore produced a greater power density. If we assume that E is constant as the electrode spacing is changed, then the power for a 2-cm electrode spacing with internal and external resistances of $R_{int2}$ and $R_{ex2}$, can be obtained from the 3-cm electrode spacing according as $$P_2 = \frac{P_3 R_{ex2} (R_{int3} + R_{ex3})^2}{R_{ex3} (R_{int2} + R_{ex2})^2} \quad (8)$$

Using eq. 8 and data for the 3-cm electrode spacing ($P_3$=826 mW/m$^2$, $R_{int3}$=56Ω, $R_{ex3}$=200Ω), we predict a maximum power densities of $P_2$=990 mW/m$^2$ when the electrode spacing is 2 cm ($R_{int2}$=34Ω, $R_{ex2}$=200Ω) and $P_1$=1510 mW/m$^2$ for the 1 cm spacing ($R_{int1}$=14Ω, $R_{ex1}$=150Ω). These results are similar to the maximum power densities of 1007 mW/m$^2$ and 1540 mW/m$^2$ obtained for electrode spacing using 2 cm and 1 cm, and demonstrate the importance of the internal resistance to power generation and thus hydrogen generation.

Thus it is preferred that the distance between an anode and cathode at a point at which they are closest to each other is in the range between 0.1-100 centimeters. In a preferred embodiment, the distance between an anode and cathode at a point at which they are closest to each other is in the range between 0.25-5 centimeters. In a further preferred embodiment, the distance between an anode and cathode at a point at which they are closest to each other is in the range between 0.5-2 centimeters.

An anode and cathode may have any of various shapes and dimensions and are positioned in various ways in relation to each other. In one embodiment, the anode and the cathode each have a longest dimension, and the anode and the cathode are positioned such that the longest dimension of the anode is parallel to the longest dimension of the cathode. In another option, the anode and the cathode each have a longest dimension, and the anode and the cathode are positioned such that the longest dimension of the anode is perpendicular to the longest dimension of the cathode. Further optionally, the anode and the cathode each have a longest dimension, and the anode and the cathode are positioned such that the longest dimension of the anode is perpendicular to the longest dimension of the cathode. In addition, the anode and the cathode may be positioned such that the longest dimension of the anode is at an angle in the range between 0 and 180 degrees with respect to the longest dimension of the cathode.

Electrodes of various sizes and shapes may be included in an inventive system. In general, an anode has a surface having a surface area present in the reaction chamber and the cathode has a surface having a surface area in the reaction chamber. In one embodiment, a ratio of the total surface area of anodes to surface area of cathodes in an inventive system is about 1:1. In one embodiment, the anode surface area in the reaction chamber is greater than the cathode surface area in the reaction chamber This arrangement has numerous advantages such as lower cost where a cathode material is expensive, such as where a platinum catalyst is included. In addition, a larger anode surface is typically advantageous to provide a growth surface for anodophiles to transfer electrons to the anode. In a further preferred option a ratio of the anode surface area in the reaction chamber to the cathode surface area in the reaction chamber is in the range of 1.5:1-1000:1 and more preferably 2:1-10:1.

Electrodes may be positioned in various ways to achieve a desired spacing between the electrodes. For example, a first electrode may be positioned such that its longest dimension is substantially parallel to the longest dimension of a second electrode. In a further embodiment, a first electrode may be positioned such that its longest dimension is substantially perpendicular with respect to the longest dimension of a second electrode. Additionally, a first electrode may be positioned such that its longest dimension is at an angle between 0 and 90 degrees with respect to the longest dimension of a second electrode. Optionally, a proton exchange membrane is interposed between the anode and the cathode. However, in a highly preferred embodiment, a reaction chamber included in an inventive system is a single chamber reactor. In particular, a single chamber reactor is provided which is not divided into an anode chamber and a cathode chamber by a PEM or other separator. Power output of an inventive system is increased by not using a PEM separating an anode chamber from a cathode chamber.

In a preferred embodiment, the cathode contains one or more cathode shielding materials. Such a shielding material may preferably include a layer of a shielding material disposed on any cathode surface, including an inner cathode surface, that is, a cathode surface present in the interior volume of the reaction chamber, and an outer surface, that is, a cathode surface exterior to the reaction chamber. A cathode surface exterior to the reaction chamber is likely to be present where a gas cathode is used, where the exterior cathode surface is in contact with a gas. Thus, in one embodiment an outer surface of a cathode is covered partially or preferably wholly by a cathode diffusion layer (CDL). The CDL may be directly exposed to the gas phase and is preferably bonded to the cathode to prevent water leakage through the cathode from the interior of the reaction chamber. Further, the CDL is hydrogen permeable, allowing hydrogen to freely diffuse from the catalyst in the cathode into a gas collection chamber, gas conduit or other component of a gas collection system. A CDL may further provide support for the cathode and may further form a portion of a wall of a reaction chamber. A CDL can also help to reduce bacteria from reaching the cathode and fouling the surface. A CDL includes a hydrogen permeable hydrophobic polymer material such as polytetrafluoroethylene (PTFE) or like materials. The thickness of this material can be varied or multiple layers can be applied depending on the need to reduce water leakage.

In a preferred embodiment, an inner cathode surface is protected by a cathode protection layer (CPL). A function of the CPL is to protect the cathode from biofouling of the catalyst. Further, a CPL reduces diffusion of carbon dioxide to the cathode so as to limit methane formation from both abiotic and biotic sources, or from the action of bacteria, at the cathode.

In one embodiment, a CPL is configured such that it is in contact with an inner surface of a cathode. Thus, for instance, a CPL may be configured to cover the inner surface of the cathode partially or wholly, such as by bonding of the CPL to the cathode.

In a further embodiment, a CPL is present in the interior of the reaction chamber but not in contact with the cathode. The inclusion of such a CPL defines two or more regions of such a reactor based on the presence of the CPL. The CPL can be proton, liquid, and/or gas permeable barriers, such as a filter. For example, a filter for inhibiting introduction of large particulate matter into the reactor may be positioned between the anode and cathode such that material flowing through the reaction chamber between the anode and cathode passes through the filter. Alternatively or in addition, a filter may be placed onto the cathode, restricting the passage of bacteria-sized particles to the cathode. Further, a filter may be positioned between an inlet channel and/or outlet channel and the interior of the reaction chamber or a portion thereof. Suitable filters may be configured to exclude particles larger than 0.01 micron-1 micron for example.

In one embodiment, a CPL includes a "proton diffusion layer" for selectively allowing passage of material to the vicinity of a cathode. In one embodiment, a diffusion layer includes an ion exchange material. Any suitable ion conducting material which conducts protons may be included in a proton exchange membrane. For example, a perfluorinated sulfonic acid polymer membrane may be used. In particular, a proton exchange membrane such as NAFION, that conducts protons, may be used for this purpose.

In a preferred embodiment, a diffusion layer includes an anion exchange material. In a preferred embodiment the diffusion layer includes an anion exchange material that conducts anions, associated with protons produced by anodophilic bacteria, to the cathode, such as a quaternary amine styrene divinylbenzene copolymer. An included diffusion layer further functions to inhibit diffusion of gas to or from the cathode relative to the anode chamber. Without wishing to be bound by theory it is believed that the protons associated with the negatively charged, anionic, ion exchange groups, such as phosphate groups, specifically allow passage of negatively charged anions that contain positively charged protons but overall carry a net negative charge, and not allowing passage of positively charged ions and reducing the diffusion of hydrogen into the anode chamber. Such a diffusion layer allows for efficient conduction of protons across the barrier while inhibiting backpassage passage of hydrogen. An example of such a diffusion layer material is the anion exchange membrane AMI-7001, commercially supplied by Membranes International, Glen Rock, N.J. In addition to membrane form, the diffusion layer can also include an anion conducting material applied as a paste directly to the cathode. In a preferred embodiment, an anion exchange material can be used to contain the catalyst applied to the cathode.

In a further preferred low resistance configuration, an anode is included in an inventive system which is porous to a liquid containing an organic substrate for anodophilic bacteria. In such an embodiment, a first channel, the anode and the cathode are preferably positioned such that a liquid containing an organic substrate for anodophilic bacteria which is introduced into the interior of the reaction chamber through the channel passes through the porous anode prior to reaching the cathode. Such a configuration is advantageous promoting proton flux between an anode and a cathode, decreasing internal resistance and thus increasing power output. Thus, in a preferred embodiment, an anode included in an inventive system is porous to a medium containing a substrate for bacterial metabolism, such as wastewater. An exemplary porous anode is a carbon cloth anode. In a particular embodiment, a porous carbon cloth anode and an air driven cathode are included in an inventive system.

As noted, a first channel is included defining a passage from the exterior of the reaction chamber to the interior. More than one channel may be included to allow and/or regulate flow of materials into and out of the reaction chamber. For example, a channel may be included to allow for outflow of a gas generated at the cathode. Further, a channel may be included to allow for outflow of a gas generated at the anode.

An inventive system may be configured as a batch processor or as a continuous flow system to process organic matter for hydrogen production. In a particularly preferred continuous flow configuration, a channel may be included to allow flow of a liquid containing an organic material oxidizable by anodophilic bacteria into the chamber and a separate channel may be used to allow outflow of liquid from which the organic material has been depleted due to oxidation by bacteria.

More than one channel may be included for use in any inflow or outflow function.

A regulator device, such as a valve, may be included to further regulate flow of materials into and out of the reaction chamber.

A pump may be provided for enhancing flow of liquid or gas into and/or out of a reaction chamber.

Optionally, an inventive system is provided which includes more than one anode and/or more than one cathode. For example, from 1-100 additional anodes and/or cathodes may be provided. The number and placement of one or more anodes and/or one or more electrodes may be considered in the context of the particular application. For example, in a particular embodiment where a large volume of substrate is to be metabolized by microbial organisms in a reactor, a larger area of anodic surface may be provided. Similarly, a larger area of cathode surface may be appropriate. In one embodiment, an electrode surface area is provided by configuring a reactor to include one or more electrodes that project into the reaction chamber. In a further embodiment, an electrode surface area is provided by configuring the cathode as a wall of the reactor, or a portion of the wall of the reactor, The ratio of the total surface area of the one or more anodes to the total volume of the interior of the reaction chamber can be in the range of 1000:1-1:1 square meters per cubic meter and preferably in the range of 500:1-50:1.

In one embodiment, the wall of the reaction chamber includes a support structure for supporting an anode or cathode. In an embodiment in which a support is placed at a surface of a gas cathode facing away from the reaction chamber, the support for a cathode is porous to hydrogen so that hydrogen can pass through the support, for instance to a portion of a collection system such as a hydrogen conduit or container.

In a further embodiment, the wall of the reaction chamber includes two or more portions such as a structural portion and an electrode portion. A structural portion provides structural support for forming and maintaining the shape of the reaction chamber, as in a conventional wall. An electrode portion of a wall may provide structural support for the reaction chamber and in addition has a functional role in a process carried out in an inventive system. In such an embodiment, the structural portion and electrode portion combine to form a wall defining the interior of the reaction chamber. In a specific embodiment, the electrode portion of the wall includes the cathode. Further, a support structure for supporting an anode or cathode may be included in an electrode portion of the wall. Such a support structure may further provide structural support for forming and maintaining the shape of the reaction chamber Generally a hydrogen gas collection system is included in an inventive reactor system such that the hydrogen gas generated is collected and may be stored for use, or directed to a point of use, such as to a hydrogen fuel powered device. For example, a hydrogen gas collection unit may include one or more hydrogen gas conduits for directing a flow of hydrogen gas from the cathode to a storage container or directly to a point of use. A hydrogen gas conduit is optionally connected to a source of a sweep gas. For instance, as hydrogen gas is initially produced, a sweep gas may be introduced into a hydrogen gas conduit, flowing in the direction of a storage container or point of hydrogen gas use. For instance, a hydrogen collection system may include a container for collection of hydrogen from the cathode. A collection system may further include a conduit for passage of hydrogen. The conduit and/or container may be in gas flow communication with a channel provided for outflow of hydrogen gas from the reaction chamber. Typically, the conduit and/or container are in gas flow communication with the cathode, particularly where the cathode is a gas cathode.

Figure 4:
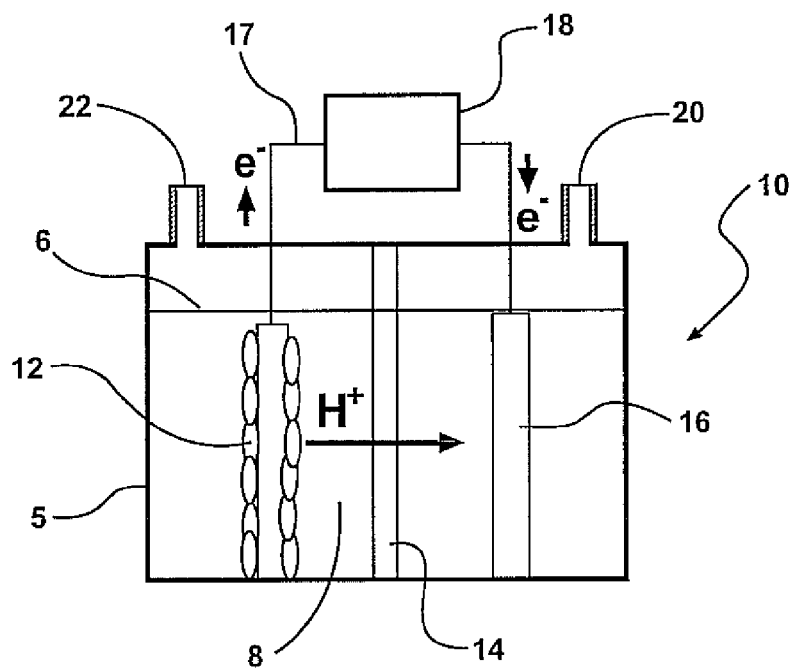
FIG. 4 is a drawing illustrating a generalized schematic of an electrochemically assisted microbial fuel cell, showing two chambers separated by an optional proton exchange membrane (PEM) with the voltage set using a power supply (PS). Gas is sampled via sampling ports at the top of the reactors.

FIG. 4 illustrates an embodiment of an inventive system at 10. In this illustration, a reaction chamber is shown having a wall 5 defining an interior and exterior of the reaction chamber, and fluid, such as an aqueous solution containing oxidizable organic matter, in the interior of the reaction chamber, the fluid level shown at 6. An anode having bacteria disposed thereon is shown at 12 and a cathode is shown at 16. A space 8 between the electrodes is further depicted. An optional PEM or filter is shown at 14 positioned between the anode 12 and cathode 16. A conduit for electrons 17 is shown along with a connected power source shown at 18. A channel which is an outlet for a cathode gas is shown at 20 and a channel which may serve as an inlet for an aqueous solution of an organic substance oxidizable by the anodophilic bacteria is shown at 22. It is appreciated that the channel 22 may also serve as an outlet for anode gas, such as $CO_2$. In another embodiment, separate channels for outflow of anode gas and inflow of organic material are provided.

FIG. 5 shows a tubular configuration of an inventive reactor 100. In this configuration a portion of the wall 105 of the reaction chamber is depicted. Further shown is a structural support for an anode 110 which also forms a portion of a reaction chamber wall. Also shown is a structural support for a cathode 120 which forms a portion of a reaction chamber wall. Each of multiple anodes is shown at 115 in contact with the support for anodes 110, and a cathode is shown at 125, in contact with a support for the cathode 120. A space 108 between an anode and a cathode is shown. A first channel 127 is shown as an inlet port and a second channel 128 as an outlet port. A conduit for electrons 117 is illustrated contacting anodes at the anode support 110 and the cathode 125 at the cathode support 120. A power supply is illustrated at 118. The indicators "5A" show the line along which the apparatus is sectioned to show the cross section of the reaction chamber illustrated in FIG. 5A. The cross-section in FIG. 5A illustrates a wall of the reaction chamber 105, anodes 115, a cathode 125 and a space 108 between an anode 115 and a cathode 125.

FIG. 6A shows a portion 200 of a reaction chamber which is shown in full in FIG. 5. The portion 200 shows multiple anodes 215 and a support structure 210 for the anodes which forms a portion of the reaction chamber wall.

FIG. 6B shows a portion 300 of a reaction chamber which is shown in full in FIG. 5. The portion 300 shows a cathode 325 and a support structure 320 for the cathode which forms a portion of the reaction chamber wall.

FIG. 7 illustrates a portion of a cathode assembly at 425. The cathode assembly 425 is a portion of a cathode in the form of a rod such as depicted at 125 and 325. The portion shown at 425 illustrates a surface of the cathode facing one or more anodes and which includes an optional cathode protective layer 430. The thickness of the cathode material is illustrated at 432 showing a sectional view. A gas porous support for a cathode is shown at 440. A gas flow path in an interior cavity is indicated at 450 showing that hydrogen evolved at the cathode passes to an interior cavity formed by the wall of the support and the cathode. The hydrogen passing to the cavity is collected for storage or use.

FIG. 8 shows a tubular configuration of reaction chamber 500 included in an inventive system in which a cathode forms a portion of the reactor wall. Illustrated is a support 510 for multiple anodes 515. In this embodiment, 520 and 510 act as supports for a cathode 525 which forms a wall of the reaction chamber 500. A space between anodes 515 and the cathode 525 is shown at 508. A first channel 527 and a second channel 528 are shown. A conduit 517 for electrons connecting the anode and cathode, and a power supply 518 are each included in an inventive system.

FIG. 9 shows an inventive system in which a longest dimension of an anode and a cathode are oriented parallel with respect to each other. An inventive system 600 including a wall 605 of a reaction chamber having an interior volume 608, a support structure for an anode 610 which also forms a portion of a wall of the reaction chamber, and a support for a cathode 640 which may also be a cathode diffusion layer, for instance where a gas cathode is employed as in this example, which is porous to hydrogen and which also forms a portion of a wall of the reaction chamber. An anode 615 and a cathode 625 are shown in contact with support structures 610 and 640 respectively. A cathode protective layer 680 is shown in the interior volume of the reaction chamber 608 in contact with a surface of the cathode 625. A space between the anode 615 and cathode 625 is shown in the interior of the reaction chamber. In this configuration the anode 615 and cathode 625 each have a long dimension and are positioned relative to each other such that the long dimensions are parallel. A first channel 627 depicted as an inlet channel and a second channel 628 depicted as an outlet channel are shown. A conduit for electrons connecting the anode and cathode, and a power supply are each included in an inventive system (not shown). A hydrogen collection system including a passageway for gases 675, such as for a sweep gas and hydrogen, is illustrated along with a collection container for hydrogen 670.

FIG. 10 shows an inventive system in which a longest dimension of an anode and a cathode are oriented perpendicularly with respect to each other. An inventive system 700 including a wall 705 of a reaction chamber having an interior volume 708, a support structure for an anode 710 which also forms a portion of a wall of the reaction chamber, and a support for a cathode 740 which is porous to hydrogen and which also forms a portion of a wall of the reaction chamber. An anode 715 and a cathode 725 are shown in contact with support structures 710 and 740 respectively. A space 708 between the anode 715 and cathode 725 is shown in the interior of the reaction chamber. In this configuration the anode 715 and cathode 725 each have a long dimension and are positioned relative to each other such that the long dimensions are perpendicular. A first channel 727 depicted as an inlet channel and a second channel 728 depicted as an outlet channel are shown. A conduit for electrons connecting the anode and cathode, and a power supply are each included in an inventive system (not shown). A hydrogen collection system including a passageway for gases 775, such as for a sweep gas and hydrogen, is illustrated along with a collection container for hydrogen 770.

FIG. 11 shows a tubular configuration of reaction chamber 500 included in an inventive system in which a cathode forms a portion of the reactor wall, similar to that shown in FIG. 8. Illustrated is a support 510 for multiple anodes 515. In this embodiment, 520 and 510 act as supports for a cathode 525 which forms a wall of the reaction chamber 500. A space between anodes 515 and the cathode 525 is shown at 508. A first channel 527 and a second channel 528 are shown. A conduit for electrons connecting the anode and cathode, and a power supply are each included in an inventive system (not shown). A conduit for hydrogen is shown at 575 for collection of hydrogen which passes through the cathode 525 into the conduit 575. A hydrogen collection container is shown at 570.

Figure 12:
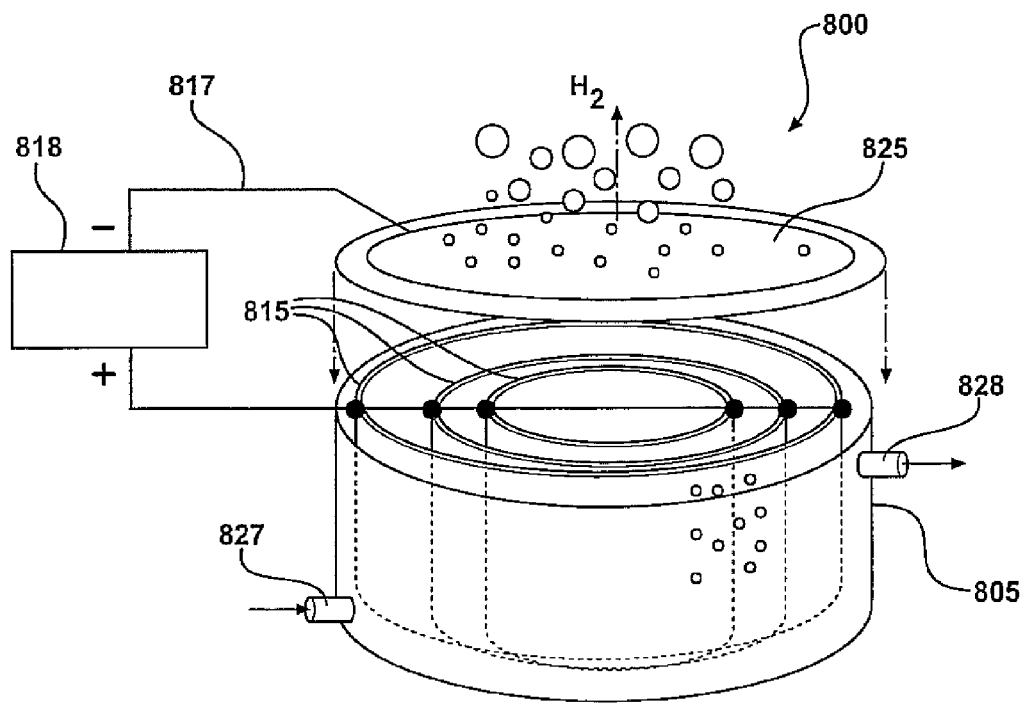
FIG. 12 is a drawing illustrating an inventive system having concentric anodes.

FIG. 12 shows an embodiment 800 of an inventive system having a wall 805, concentric anodes 815, a cathode 825, a first channel 827 depicted as an inlet channel and a second channel 828 depicted as an outlet channel. A conduit for electrons 817 is shown connecting the anodes 815 and the cathode 825. A power supply 818 is connected to the conduit 817.

Figure 13:
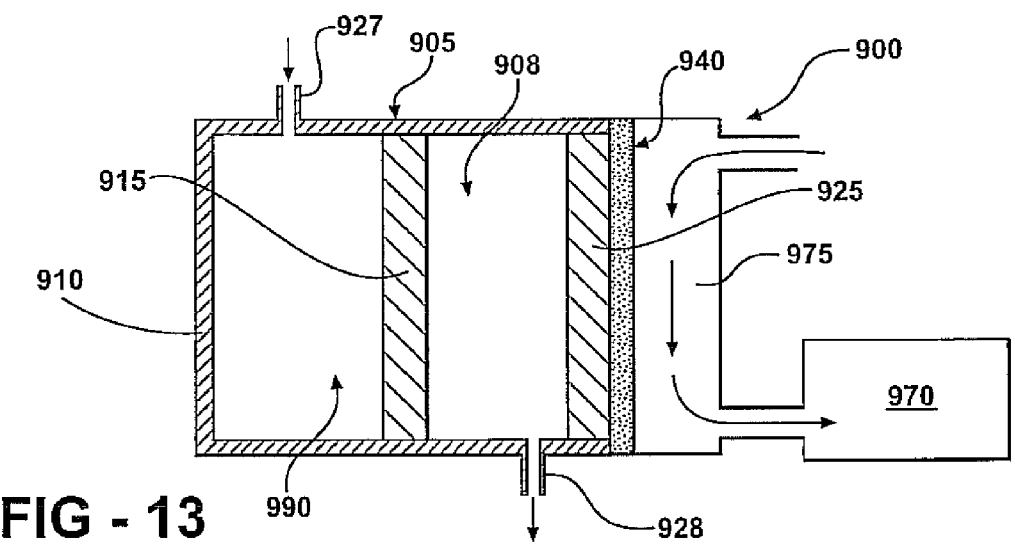
FIG. 13 is a drawing illustrating an inventive system in which flow is directed through a porous anode.

FIG. 13 shows an inventive system in which flow is directed through an anode. In the illustrated system, a longest dimension of an anode 915 and a cathode 925 are oriented parallel with respect to each other. An inventive system 900 is shown including a wall 905 of a reaction chamber having an interior volume 908 and 990, a support structure for an anode 910 which also forms a portion of a wall of the reaction chamber, and a support for a cathode 940 (which may also be called an outer cathode diffusion layer, which is porous to hydrogen and which also forms a portion of a wall of the reaction chamber. An anode 915 and a cathode 925 are shown in contact with support structures 910 and 940 respectively. An optional inner cathode diffusion layer may be placed in contact with a surface of the cathode 925 internal to the reaction chamber (not shown). A space between the anode 915 and cathode 925 is shown in the interior of the reaction chamber 908. In this configuration the anode 915 and cathode 925 each have a long dimension and are positioned relative to each other such that the long dimensions are parallel. A first channel 927 depicted as an inlet channel positioned such that flow of material such as an aqueous solution of oxidizable organic material flows in through the channel 927 into the interior volume 990 of the reaction chamber and passes through a porous anode 915 to reach the interior volume 908 of the reaction chamber. A second channel 928 is depicted as an outlet channel for outflow of material such as an aqueous solution relatively depleted of oxidizable organic material following incubation in the reaction chamber with anodophiles. A conduit for electrons connecting the anode and cathode, and a power supply are each included in an inventive system (not shown). A hydrogen collection system including a passageway for gases 975, such as for a sweep gas and hydrogen, is illustrated along with a collection container for hydrogen 970.

An inventive system is built on larger scale for industrial or commercial use. A larger scale system include a dedicated hydrogen producing system, or it can be linked to a microbial fuel cell that to provide additional potential. The large scale BEAMR reactor preferably includes an inexpensive conductive surface for the anode, but one that is also structurally sound at the large scale, and so the anode is similar to those included in smaller systems and may preferably include resilient conductive plastic polymers or plastics with a conductive coating. A cathode included in a larger scale system is similar to that included in smaller systems and can be made of the same materials as the anode, and further includes a metal catalyst such as Pt, Pd or Co with a binder and coatings of materials such as NAFION and/or anion exchange materials as cathode protection materials. Such a system preferably allows for flow through the anode toward the cathode with minimal or no backflow towards the anode. Optionally a membrane such as NAFION or other ion exchange material and/or a type of ultrafiltration membrane to allow transport of ionic species but not bacteria or large molecular weight organic materials is included.

An inventive process for producing hydrogen is detailed which includes providing an inventive system for producing hydrogen. Further provided are anodophilic bacteria which are disposed within the interior of the reactor. An organic material oxidizable by an oxidizing activity of the anodophilic bacteria is introduced into the reaction chamber of an inventive system and incubated with the anodophilic bacteria under oxidizing reaction conditions for a period of time sufficient such that an oxidation reaction occurs, producing electrons which are transferred to the anode, and protons which diffuse to the cathode. A power source is activated to increase a potential between the anode and the cathode, such that electrons and protons combine to produce hydrogen gas in the vicinity of the cathode. The hydrogen gas may then be collected for use or storage. Reaction times depend on reactor conditions but are generally in the range of seconds-hours.

Reaction conditions include variable such as pH, temperature, osmolarity, and ionic strength of the medium in the reactor. In general, the pH of the medium in the reactor is between 3-9, inclusive, and preferably between 5-8.5 inclusive.

Reaction temperatures are typically in the range of about 10-40° C. for non-thermophilic bacteria, although the device may be used at any temperature in the range of 0 to 100° C. by including suitable bacteria for growing at selected temperatures. However, maintaining a reaction temperature above ambient temperature may require energy input and it is preferred to maintain the reactor temperature at about 15-25° C. without input of energy. A surprising finding of the present invention is that reaction temperatures in the range of 16-25° C., inclusive or more preferably temperatures in the range of 18-24° C., inclusive and further preferably in the range of 19-22° C., inclusive, allow hydrogen generation, electrode potentials, Coulombic efficiencies and energy recoveries comparable to reactions run at 32° C. which is generally believed to be an optimal temperature for anaerobic growth and metabolism, including oxidation of an organic material.

Ionic strength of a medium in a reactor is preferably in the range of 50-500 millimolar, more preferably in the range of 75-450 millimolar inclusive, and further preferably in the range of 100-400 millimolar, inclusive.

In one embodiment, the anodophilic bacteria are disposed on the anode and are capable of direct transfer of electrons to the anode. A microbial organism is placed in the interior of the reaction chamber. In a preferred embodiment, the microbial organism is an obligate or facultative anaerobe. Suitable microbial organisms preferably include anodophilic bacteria or anodophiles. The term "anodophiles" and "anodophilic bacteria" as used herein refer to bacteria that transfer electrons to an electrode, either directly or by endogenously produced mediators. Examples of anodophilic bacteria include bacteria selected from the families Aeromonadaceae, Alteromonadaceae, Clostridiaceae, Comamonadaceae, Desulfuromonaceae, Enterobacteriaceae, Geobacteraceae, Pasturellaceae, and Pseudomonadaceae. These and other examples of bacteria suitable for use in an inventive system are found in references including 8-10, 11-13 and 101-105. Anodophilic bacteria preferably are in contact with an anode for direct transfer of electrons to the anode. However, in the case of anodophilic bacteria which transfer electrons through a mediator, the bacteria may be present elsewhere in the reactor and still function to produce electrons useful in an inventive process.

Anodophilic bacteria may be provided as a purified culture, enriched in anodophilic bacteria, or even enriched in a specified species of bacteria, if desired. Pure culture tests have reported Coulombic efficiencies as high as 98.6% (9). Thus, the use of selected strains may increase overall electron recovery and hydrogen production, especially where such systems can be used under sterile conditions. Bacteria can be selected or genetically engineered that can increase Coulombic efficiencies and potentials generated at the anode.

Further, a mixed population of bacteria may be provided, including anodophilic anaerobes and other bacteria. Aerobes will be quickly eliminated from the reactor since the reactor is operated anaerobically. Mixed populations of different anodophilic species are provided, for example, in wastewater. Further, a purified cultures developed for inclusion in an inventive process may be used.

In one embodiment, anodophilic bacteria are selected for in test runs and an anode having such bacteria present is used in a process to produce hydrogen.

The microbial organism in the reaction chamber is brought in contact with an organic substance which the organism is capable of oxidizing. Using an inventive bioelectrochemically assisted reactor, hydrogen can be produced from any type of biodegradable organic matter, although the Coulombic efficiencies and power densities will vary depending on the substrate (16, 22). Virtually any type of biodegradable organic matter may be used to produce electricity in a MFC, including carbohydrates (15-22), amino acids and proteins (24-25), and animal, human, and industrial wastewaters (16, 26). Illustrative examples of an oxidizable organic substance include glucose, acetate, butyrate, dextran, ethanol, cysteine and a combination thereof. Of particular interest as an organic substance which is oxidizable by anaerobic bacteria is such a substance contained in wastewater. The term "wastewater" as used herein refers to water containing organic material, particularly aqueous waste disposed from domestic, municipal, commercial, industrial and agricultural uses, Other suitable organic substances will be recognized by one of skill in the art.

An oxidizable organic substance may be delivered to the organism in a suitable medium or solvent compatible with bacterial metabolism. A preferred medium is aqueous. Further, the medium or solvent may be adjusted to a be compatible with bacterial metabolism, for instance by adjusting pH to be in the range between about pH 3-9, preferably about 5-8.5, inclusive, by adding a buffer to the medium or solvent if necessary, and by adjusting the osmolarity of the medium or solvent by dilution or addition of a osmotically active substance. Ionic strength may be adjusted by dilution or addition of a salt for instance. Further, nutrients, cofactors, vitamins and other such additives may be included to maintain a healthy bacterial population, if desired, see for example examples of such additives described in Lovley and Phillips, Appl. Environ. Microbiol., 54(6):1472-1480.

Optionally and preferably, a medium containing an organic substance may be processed to remove solids, such as particles larger than about 5 millimeters, prior use in an inventive reactor as a substrate for bacterial metabolism. For instance, wastewater is preferably filtered to remove solids in one embodiment. Such filtration may occur prior to introduction into the reactor, in the reactor prior to contact with an anode, and/or prior in the reactor prior to contact with a cathode.

In general, the activation of the power source includes application of a voltage in the range of 25-1600 millivolts. In some embodiment a voltage in the range of 0.1-1600 millivolts may be used depending on the bacteria used. In a further embodiment, no additional voltage is necessary.

Generally, an inventive process includes collection of produced hydrogen for storage or use. The hydrogen gas may be collected using a "sweep gas" if desired. For instance, during an initial phase of operation of the reaction chamber a gas which is unreactive with hydrogen is blown across a portion of the cathode such that hydrogen gas is moved away from the cathode and into a collection portion. In later phases of operation, use of a sweep gas may not be necessary. An exemplary sweep gas is nitrogen.

The efficiency of an inventive process can be improved by scavenging carbon dioxide generated by the system using a chemical scavenger such as lithium or sodium hydroxide.

In an embodiment of an inventive system primary and secondary fermentation reactors are included. A microbial organism or organismal cell is included to carry out the primary fermentation reaction. Illustrative organisms of the type include in a primary fermentation reaction in a system according to the invention include prokaryotic organisms such as bacteria. A secondary fermentation reaction takes place when an organism metabolizes a by-product of a primary fermentation reaction. The term fermentation describes a process in which an agent causes an organic substance to break down into simpler substances. Fermentation differs depending on the nature of the agent which causes it. Such agents, which may also be called ferments, are microbial organisms or cells as described herein, and their fermentation reactions are apart of their growth and development. For example, the anaerobic breakdown of sugar into alcohol, by yeast for instance, is a common fermentation reaction. The term "primary reaction" is used synonymously herein with the term "fermentation reaction" to describe a process that results in a by-product. The by-product is then used in what is termed herein a "secondary reaction" or "secondary fermentation" indicating that the by-product may be metabolized as described herein in order to produce hydrogen gas.

Embodiments of inventive compositions and methods are illustrated in the following examples. These examples are provided for illustrative purposes and are not considered limitations on the scope of inventive compositions and methods.

EXAMPLES

Example 1

Exemplary hydrogen-generating reactors are constructed in this example. Exemplary reactors described in this example are two-chamber MFCs with the anode and cathode separated by a proton exchange membrane (PEM; NAFION™ 117) (FIG. 4). The anode electrodes are plain carbon cloth and the cathode electrodes are made of carbon paper containing 0.5 mg-Pt/$cm^2$.

A first exemplary reactor system is a two-bottle reactor (310 mL-capacity each; Wheaton™ Scientific) with a PEM held by a clamp in a tube separating the chambers, with electrodes spaced 15 cm apart. Instead of sparging the cathode chamber with air, the chamber is sealed and analyzed periodically for hydrogen gas production. Each electrode is 12 $cm^2$ and the proton exchange membrane is 3.5 $cm^2$, and the bottles are filled to 200 mL.

A second exemplary reactor is based is a tubular shaped reactor. This reactor is converted into a two-chamber system by inserting a PEM into the middle of a 4-cm long cylindrical chamber (3-cm in diameter, formed of Plexiglass) sealed on both sides to avoid gas leaking into the system. The two electrodes (7 $cm^2$ each) are placed in the chambers on opposite sides of the PEM, with each electrode set at a distance 0.25 cm from the PEM. This arrangement is essentially that shown in FIG. 4 except the chambers did not contain a headspace: gas produced in the cathode chamber is released into a sealed gas bottle (120 ml) that is analyzed periodically for hydrogen as described below.

The bacteria used in the anode chamber are enriched in a conventional microbial fuel cell using domestic wastewater as the inoculum, using techniques as described in (15). After enrichment, the anode is removed and placed into the anode chamber of one of the hydrogen-producing reactors described above. The anode chamber contained a phosphate buffer (50 mM, pH=7.0) and a nutrient medium while the cathode chamber contained only buffer (15). Acetate is used as an energy source in all tests. Both chambers are initially purged with $N_2$ gas to remove oxygen.

The anode potential, which is set by the potential of the respiratory enzymes used to make energy for the cell from the oxidation of organic matter, is measured by multimeter using a reference electrode (Ag/AgCl). A voltage in the range of 250-850 mV (first reactor) or 450-850 mV (second reactor) is applied to the circuit by connecting the positive pole of a programmable power supply (3645A, Array Elec. Co. Ltd) to the anode, and the negative pole to the cathode. A potential of 250 mV (first reactor) or 450 mV (second reactor) is then used until the anode potential increased above zero. In tests where the applied voltage is varied, the anode chamber solution is replaced with new medium and the voltage increased in 100 mV intervals.

Acetate in the solution is measured at the end of a test by analysis of the sample using a gas chromatograph (Agilent, 6890) equipped with a flame ionization detector and a fused-silica capillary column (30 m×0.32 mm×0.5 μm DB-FFAP) as described in reference 15. The volume of gas produced in the cathode chamber (or collected in the bottle attached to the cathode chamber) a bottle is measured using a glass syringe (10 mL capacity; Perfektum Syringes; Popper & Sons, Inc.)

(20). Hydrogen concentration is measured using a gas chromatograph (&C; Model 310, SRI Instruments, Torrence, Calif.) equipped with a thermal conductivity detector and a molecular sieve column (Alltech Molesieve 5 A 80/100 6'×1/8'×0.085) with nitrogen as the carrier gas. (20).

The Coulombic efficiency is calculated as: $CE=C_p/C_T \times 100\%$, where $C_p$, is the total Coulombs calculated by integrating the current over time. $C_T$ is the theoretical amount of coulombs that can be produced from acetate, calculated as $C_T=F\ b\ S\ v/M$, where F is Faraday's constant (96,485 C/mol-electrons), b=8 the number of moles of electrons produced per mol of acetate substrate, S the substrate concentration, v the liquid volume, and M=82 the molecular weight of acetate. Further details of system set up and operation may be found in references 15 and 19.

Example 2

Figure 2:
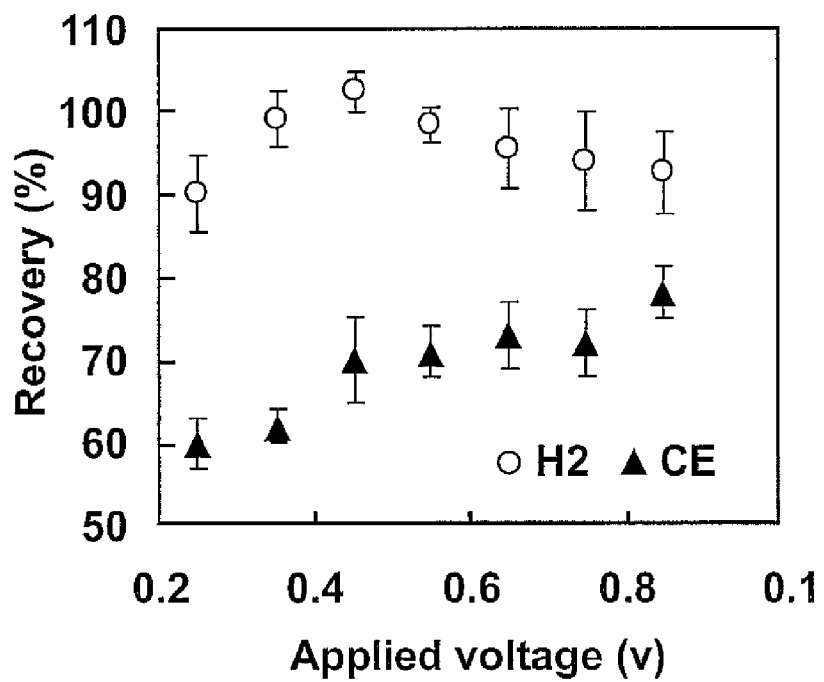
FIG. 2 is a graph illustrating hydrogen recovery and Coulombic efficiency (CE) as a function of the applied voltage in an inventive hydrogen generating system.

Measurements of current density are made using a reactor as described in example 1. FIG. 1 shows increased current density (CD) and anode potential (AP) with the applied voltage in an inventive hydrogen generating system described in example 1. Error bars±S.D. are based on averages measured during stable conditions in three separate batch experiments. Current density increased with the applied voltage from 0.15 A/m$^2$ (250 mV) to 0.88 A/m$^2$ (850 mV) (FIG. 1). The anode potential decreased with the voltage added from −291 mV (250 mV) to −275 mV (850 mV) (FIG. 2). Over 95% of the acetate is typically degraded by the end of a batch cycle (when the reactor is re-filled with fresh medium). This reactor is run for over four months, under various operating conditions, in order to demonstrate that hydrogen generation is stable in this type of reactor.

Example 3

Measurements of hydrogen recovery and Coulombic efficiency as a function of applied voltage are made using a reactor as described in example 1. FIG. 2 shows Hydrogen recovery and Coulombic efficiency (CE) as a function of the applied voltage in a two-chambered hydrogen generating system described in example 1. Error bars±S.D. are based on averages measured during stable conditions in three separate batch experiments. The recovery of electrons as hydrogen is over 90% (FIG. 2). The Coulombic efficiency, defined as the recovery of total electrons in acetate as current (eq. 1), ranged from 60-78% depending on the applied voltage (FIG. 2). This range in Coulombic efficiency is similar to that obtained in some aerobic MFCs (21, 22). Assuming a maximum possible production of 4 mol-H$_2$/mol-acetate, a 78% Coulombic efficiency, and 92% current recovery as hydrogen, the overall hydrogen yield is 2.9 mol-H$_2$/mol-acetate. The recovery of electrons is affected by many factors, including biomass production, substrate conversion to polymers and storage, and methanogenesis of hydrogen and acetate to methane.

Example 4

Figure 3:
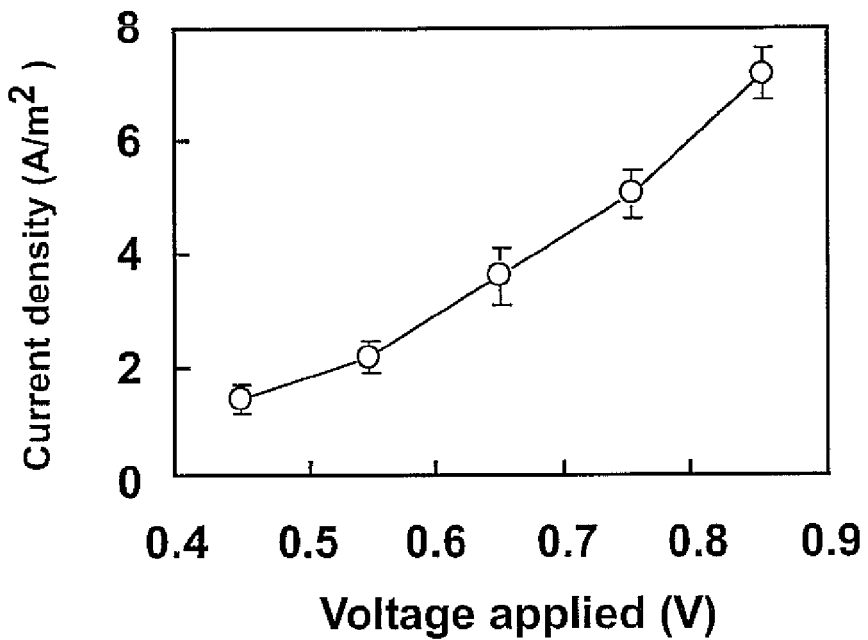
FIG. 3 is a graph illustrating current from acetate oxidation as a function of applied voltage in an inventive hydrogen-producing system.

A system described in Example 1 achieves a current density <1 A/m$^2$ at applied voltages as large as 850 mV. The system has a low internal resistance, due to an increased membrane surface area and decreased spacing between the electrodes. In preliminary tests with this system, hydrogen generation is stable over a two-month period. Using this system, higher current densities (1.4-7.1 A/m$^2$; FIG. 3) are obtained compared to a conventional MWC system and Coulombic efficiencies in a typical range of 65-76% are displayed. FIG. 3 shows current from acetate oxidation as a function of applied voltage in the second two-chambered hydrogen-producing system described in example 1. Error bars±S.D. are based on averages measured during stable conditions in three separate batch experiments. Overall hydrogen recovery is reduced to 60-73%, likely due to increased loss of H$_2$ through its diffusion into the anode chamber as the system did not contain a CDL.

Example 5

A preferred reactor is a single chamber reactor without a PEM. Two electrodes, an anode and a cathode are provided and placed at a distance of 2 centimeters from each other. The bacteria used at the anode are optionally enriched on an anode in a conventional microbial fuel cell using domestic wastewater as the inoculum. After enrichment, the anode is removed from the conventional cell and placed into an inventive reactor. A phosphate buffered, 50 mM, pH=7.0, nutrient medium is introduced for bacterial metabolism. The reactor is initially purged with N$_2$ gas to remove oxygen. Gas produced in the cathode chamber is collected in a gas-tight container. Reaction conditions and results are substantially the same or better compared to the reactors described in Example 1.

Example 6

A preferred reactor includes a cathode protection layer. Two electrodes, an anode and a cathode are provided and placed at a distance of 1 centimeter from each other. A cathode protective layer is placed in contact with the cathode on portions of the cathode exposed to sources of contamination such as the anodophilic bacteria and wastewater. Reaction conditions and results are substantially the same or better compared to the reactors described in Example 1.

Example 7

A method for making a gas cathode having a cathode diffusion layer (CDL).

In this embodiment, the CDL is applied prior to applying a catalyst, since the NAFION in the catalyst solution cannot be exposed to the high temperatures described as part of an exemplary process of applying a cathode protection layer.

For a cathode size of 12 cm$^2$:

A carbon cloth (type B, 30% wet-proofed, E-TEK) is cut to the right size to serve as the cathode for a specific application. Twenty milligrams of carbon powder is weighed out (Vulcan XC-72) and 0.2 milliliters of a polytetrafluoroethylene (PTFE) solution (60 wt % dispersion in water; 445096-500 ml, Aldrich) is added and mixed to a uniform paste. All of the paste is applied to one side of the carbon cloth. The cathode with the paste is dried at room temperature (RT), and then heated at 370° C. for 20 min, not exceeding 390° C. The cathode with the carbon layer is removed from the furnace and cooled to room temperature. The carbon coated side of the cathode is then further coated with one layer of PTFE solution (60%) using a brush. The PTFE solution coating is dried at room temperature, and then the cathode is heated again at 370° C. for 10 min. This process can be repeated for up to 4 times.

A catalyst is then applied to a surface of the cathode not covered by the protective layer. In order to do this, 60 milligrams of a Pt/C catalyst mixture (10% Pt/C, from E-TEK) is weighed out for cathode size 12 cm$^2$ and 150 microliters of water is added to wet the powder and 400 microliters of a NAFION solution (5% NAFION solution, from Aldrich) is added and the ingredients are mixed to form a uniform paste. All of the paste is applied to a surface of the electrode. The electrode is dried at room temperature for at least 20 hours, or 2 hours at 80° C.

Example 8

Continuous Flow Microbial Fuel Cell (CFMFC)

A cathode (7 cm$^2$) is prepared by applying a mixture of 60 mg Pt/C catalysts (10% Pt; E-TEK) and 0.4 mL NAFION solution (5%) onto one side of the carbon cloth (12 cm$^2$, 30% wet-proofed, E-TEK) with the wet-proofing material functioning as the CDL. The cathode is dried for one day and contained a final Pt loading of 0.5 mg/cm$^2$. The anode (7 cm$^2$), made of plain carbon cloth (E-TEK type A, no wet proofing). No PEM is used in this system.

The cathode is set on one side of the Plexiglas cylinder (3 cm in diameter) at different distances from the anode by adding additional 1-cm long sections to the reactor. The flow is directed through the anode towards the cathode, with the cathode open to the air on one side and facing the reactor solution on the other side. The electrode spacing, X, defined as the distance between the anode and cathode, is set at 1, 2 or 3 cm. The distance between the anode and the sealed reactor side is constant at 2 cm. This resulted in reactor empty bed volumes of 21, 28 and 35 mL, and specific surface areas of the anode electrode per volume of reactor of 33, 25 and 20 m$^2$/m$^3$, respectively. For comparative batch MFC tests, the electrode spacing is 2-cm and the anode is placed on the opposite end of the reactor. Stainless steel wire is used to connect the electrodes to a resistor (1000Ω unless stated otherwise).

The reactor is initially inoculated using domestic wastewater collected from the primary clarifier effluent at the Pennsylvania State University Wastewater Treatment Plant and operated as a microbial fuel cell (with oxygen at the cathode, and with no external power). Before operating the reactor in continuous flow mode, the system is run in batch mode until a stable cycle of power generation is achieved (typically 5 cycles) without added external power. The reactor is fed glucose (1 g/L) in a medium consisting of a phosphate buffer (50 mM), vitamins, nutrients and minerals (21) or an appropriate medium and substrate for biodegradation by the bacteria to produce current. Flow rate is controlled by a peristaltic pump. The effect of the electrode spacing is examined using a glucose concentration of 500 mg/L and at a fixed flowrate of 3.3 ml/h. The effect of HRT on power generation is examined by maintaining a constant glucose loading rate (1.7 mg/h glucose) by varying the glucose feed concentration from 250 to 1000 mg/L (electrode spacing fixed at 2 cm). To obtain the maximum power density under fixed conditions, the external resistance in the circuit is varied from 50 to 1000Ω. All experiments are conducted at 30° C. in a temperature controlled room.

Once power generation is achieved, the resistor is removed and an external power source is used to provide the potential needed to generate hydrogen at the cathode. The cathode is sparged with nitrogen gas to remove residual oxygen before applying external power.

In some tests, primary clarifier effluent (COD=255 mg/L, pH=7.5) is used as the feed at a fixed flowrate of 6.1 ml/h, with MFCs having an electrode spacing of 1 cm HRT=3.4 h) or 2 cm (HRT=4.6 h). To limit degradation of the organic matter, the wastewater feed bottle is continuously sparged with nitrogen gas to maintain anoxic conditions and is placed in an ice-bath.

Current density, hydrogen recovery and Coulombic efficiency are calculated as described in examples above.

The chemical oxygen demand (COD) is measured using a standard method (Method 5220, APHA et al. 1995; HACH COD system, HACH company, Loveland, Colo.). All samples are filtered through a 0.2 μm (pore diameter) membrane filter prior to COD measurements. COD removal is calculated as $E_{COD}=[(COD_{in}-COD_{out})/COD_{in}]\times 100\%$, where $COD_{in}$ is the influent COD and $COD_{out}$ the effluent COD The internal resistance, $R_{int}$, is measured by electrochemical impedance spectroscopy using a PC4/750 potentiostat (Gamry Instruments) with the anode as the working electrode. The cathode is used as counter electrode and reference electrode. Impedance measurements are conducted at open circuit voltage (OCV) over a frequency range of 10$^5$ down to 0.1 Hz with sinusoidal perturbation of 10 mV amplitude.

Example 9

Using a reactor system as described in example 8, the effects of flow through the anode on current density, hydrogen recovery and Coulombic efficiency are measured. With fluid flow directed through the anode, and the MFC operated under continuous flow conditions, current density, hydrogen recovery and Coulombic efficiency are achieved at levels described in examples 1-4 or better.

Example 10

Using a reactor system as described in example 8, the effects of varying the electrode spacing are measured. When the electrode spacing is decreased, current density, hydrogen recovery and Coulombic efficiency are achieved at levels described in examples 1-4 or better. The Coulombic efficiency (CE) increases as a function of current density but is not a function of electrode spacing except to the extent that the electrode spacing affected the current density. In general, a system with the smallest electrode spacing has the highest current density.

The internal resistance of the systems linearly increases with distance between the electrodes.

Example 11

Using a reactor system as described in example 8, the current density, hydrogen recovery and Coulombic efficiency as a function of HRT are measured. A system with an electrode spacing of 2 cm is operated in continuous flow mode at three different HRTs of 4.2, 8.4 and 15.6 h (constant glucose loading rate of 1.7 mg/h) by varying the glucose concentration in the feed from 250 to 1000 mg/L. Results which are better or similar to those described in examples 1-4 may be achieved.

Example 12

Using a reactor system as described in example 8, current density, hydrogen recovery and Coulombic efficiency from domestic wastewater is measured. Results which are better or similar to those described in examples 1-4 may be achieved.

Example 13

Figure 14:
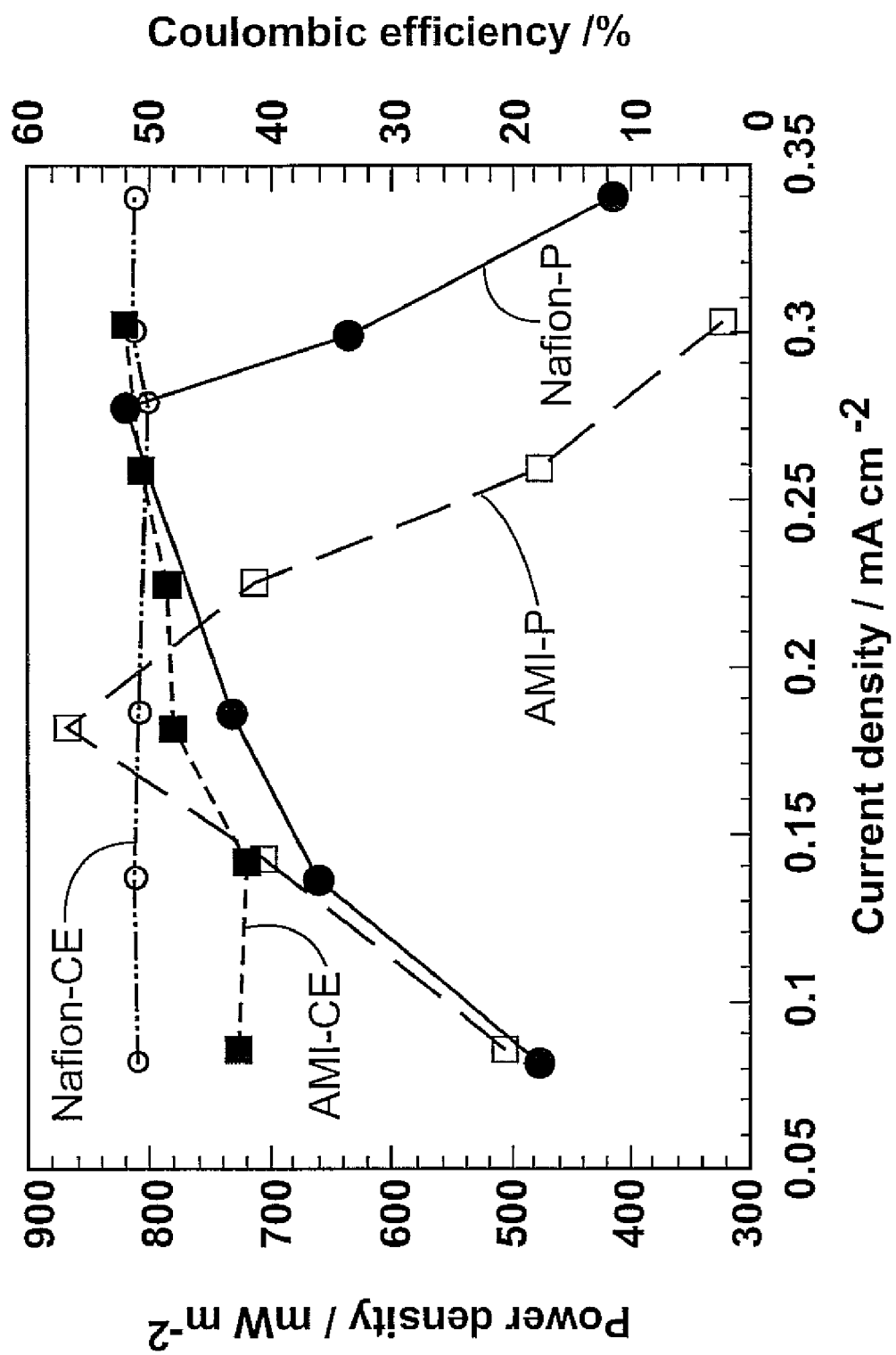
FIG. 14 is a graph illustrating effects of including a diffusion barrier between an anode and cathode in an inventive system compared to a conventional NAFION proton exchange membrane.

Systems are constructed using with different membranes for comparison of their properties. A conventional NAFION PEM is positioned between an anode and a cathode in a first system and a membrane designed to conduct anions only (AMI-7001, Membranes International, Glen Rock, N.J.) is positioned similarly in another system. 500 mg/L glucose as fuel and the distance between the anode and cathode is 4 cm. The graph shown in FIG. 14 illustrates Coulombic efficiency (CE) as a function of current density for NAFION and the AMI membranes (NAFION-CE and AMI-CE respectively). The graph also shows power density (P) for NAFION and the AMI membranes (NAFION-P and AMI-P respectively).

Example 14

A single-chamber system is constructed including an anode and cathode placed in a plastic (Plexiglas) cylindrical chamber with a length of 4 cm and a diameter of 3 cm (empty bed volume of 28 mL). The anode electrode is made of plain toray carbon paper (without wet proofing; E-Tek, USA), and is pierced in several places, forming holes about 1 mm in diameter, so that water motion in the chamber is not blocked when the anode is placed at the far end of the chamber or moved to within 2 cm of the cathode. Unless stated otherwise, the cathode is made of carbon paper containing 0.5 mg/cm² of Pt (10% of Pt/C catalyst, 30% wet-proofing, E-TEK, USA). In some tests, a carbon cloth (50% wet-proofing; E-TEK) cathode is used. A Pt/C paste is prepared by mixing a chemical binder (5% NAFION solution) and catalyst (20% Pt; E-TEK) to form a paste (final Pt content of 0.5 mg/cm2) that is applied to one side of the carbon cloth electrode. The electrode is then dried at room temperature for 24 h before use.

The system is inoculated with domestic wastewater (14 mL, about 300 mg-COD/L) and nutrient medium (14 mL; prepared as described in Liu, H.; Logan, B. E. Electricity generation using an air-cathode single chamber microbial fuel cell in the presence and absence of a proton exchange membrane. Environ. Sci. Technol. 2004, 38, 4040-4046) amended with sodium acetate (1 g/L). After replacement of this solution twice over 2 days, the system is then operated using only the nutrient medium and acetate. The system is considered to be operating under steady conditions when the maximum voltage output is reproducible after refilling the reactor with medium at least two times. Power density curves are obtained by changing the circuit resistor, measuring the maximum power generated over a complete batch cycle of operation. The medium in the reactor is refilled when the voltage dropped below about 30 mV. Once power generation is achieved, the resistor is removed and an external power source is used to provide the potential needed to generate hydrogen at the cathode. The cathode is sparged with nitrogen gas to remove residual oxygen before applying external power.

A series of experiments are conducted to study the individual effects of solution ionic strength, electrode spacing, temperature, and cathode materials on MFC performance. In one set of tests, the conductivity of the solution is increased by adding 100 (final IS=200 mM), 200 (IS=300 mM), or 300 mMNaCl (IS=400 mM) to the medium in order to investigate the effect of ionic strength on power generation. At the highest (400 mM) and lowest (100 mM) solution ionic strength, the electrode spacing is changed from 4 to 2 cm. Temperature is reduced from 32 to 20° C., and the cathode material is changed from the carbon paper to the carbon cloth electrode.

Calculations and Analysis.

Current density, hydrogen recovery and Coulombic efficiency are calculated as described in examples above.

Overall energy recovery is calculated as $E_E=(Ep/E_T) \times 100\%$, where Ep (J) is the total energy calculated by integrating the power over time. $E_T(J)$ is the theoretical amount of energy that can be produced from acetate, calculated as $$E_T = \Delta \frac{HSv}{M}$$

where ΔH is the enthalpy change of the following reaction under standard conditions:

$C_2H_4O_2 + 2O_2 \rightarrow 2CO_2(g) + 2H_2O(l)$

The internal resistance of the cell, $R_{int}$, is calculated from the slope of plots of V and I using:

$V = E_{cell} - IR_{int}$ where $E_{cell}$ is the electromotive force of the cell.

Effect of Ionic Strength.

Ionic strength affects the internal resistance of the cell, decreasing internal resistance with increasing ionic strength, where ionic strength is in the range of 100-400 millimolar. The overall coulombic efficiency, defined as the recovery of total electrons in acetate as current, increases with current density at different ionic strengths in this range. Coulombic efficiency also increases slightly with ionic strength. Current density, hydrogen recovery and Coulombic efficiency are measured using this system. Results which are better or similar to those described in examples 1-4 may be achieved.

Effect of Electrode Spacing.

The effect of electrode spacing on performance of a described system is investigated by reducing the distance between the anode and cathode from 4 to 2 cm. The internal resistance is lower when the space between electrodes is decreased. Current density, hydrogen recovery and Coulombic efficiency are measured using this system. Results which are better or similar to those described in examples 1-4 may be achieved.

Effect of Temperature.

Bacterial activities are well-known to be affected by temperature, with biological processes often modeled as an empirical function of temperature as $\theta^{(T-20)}$, where $\theta=1.20$ for microbial growth under anoxic conditions and 1.094 for heterotrophs, and T is the temperature in Celsius (Grady, C. P. L.; Daigger, G. T.; Lim, H. C. Biological Wastewater Treatment; Marcel Dekker: New York, 1999). Typically, chemical reaction rate coefficients are doubled with each 10° C. increase in temperature. Current density, hydrogen recovery and Coulombic efficiency are measured using this system at different temperatures. Results which are similar, that is, not more than 20% less efficient compared to those described in examples 1-4 may be achieved at lower temperatures in the range of 18-24° C.

Effect of Cathode Material.

By replacing the carbon paper with a carbon cloth electrode, the effects of cathode material on current density, hydrogen recovery and Coulombic efficiency is examined. Similar current density and Coulombic efficiencies may be obtained compared to examples 1-4 with both materials. At higher current density, hydrogen recovery may be greater using the carbon cloth.

LITERATURE CITED (1) Logan, B. E. Feature Article: Biologically extracting energy from wastewater: biohydrogen production and microbial fuel cells. *Environ. Sci. Technol.* 38, 160A-167A (2004).

(2) Grant, P. M. Hydrogen lifts off—with a heavy load—The dream of clean, usable energy needs to reflect practical reality. *Nature* 424, 129-130 (2003).
(3) Gross, R. Leach, M. & Bauen, A. Progress in renewable energy. *Environ. Int.* 29, 105-122 (2003).
(4) Nath, K. & Das, D. Improvement of fermentative hydrogen production: various approaches. *Appl. Microbial. Biotechnol.* 65, 520-529 (2004).
(5) Miyake, J., Masato, M. & Yasuo, A. Biotechnological hydrogen production: research for efficient light energy conversion. *J. Biotechnol.* 70, 89-101 (1999).
(6) Woodward, J. Orr, M. Cordray, K. & Greenbaum, E. Enzymatic production of biohydrogen. *Nature* 405, 1014-1015 (2000).
(7) Benemann, J., Polle, J., Huesemann, M., Yu, J., Brune, D., Weissman, J. & Kyle, D. A novel photobiological hydrogen production process. Proc. 13th International Congress of Photosynthesis, Montreal, Canada, September 2004.
(8) Bond, D. R., Holmes, D. E., Tender, L. M. & Lovley, D. R. Electrode-reducing microorganisms that harvest energy from marine sediments. *Science* 295, 483-485 (2002).
(9) Bond, D. R. & Lovely, D. R. Electricity production by *Geobacter sulfurreducens* attached to electrodes. *Appl. Environ. Microbiol.* 69, 1548-1555 (2003).
(10) Rabaey, K., Lissens, G., Siciliano, S. D. & Verstraete, W. A microbial fuel cell capable of converting glucose to electricity at high rate and efficiency. *Biotechnol. Lett.* 25, 1531-1535 (2003).
(11) Kim B. H., Park, D. H., Shin, P. K., Chang, I. S. & Kim, H. J. Mediator-less biofuel cell. U.S. Pat. No. 5,976,719 (1999).
(12) Kim, H. J., Park, H. S., Hyun, M. S., Chang, I. S. Kim, M. & Kim, B. H. A mediator-less microbial fuel cell using a metal reducing bacterium, *Shewanella putrefacians*. *Enzyme Microbiol. Tech.* 30, 145-152 (2002).
(13) Park, H. S., Kim, B. H., Kim, H. S., Kim, H. S, Kim, G. T., Kim, M., Chang, I. S., Park, Y. K. & Chang, H. I. A novel electro-chemically active and Fe(III)-reducing bacterium phylogenetically related to *Clostridium butyricum* isolated from a microbial fuel cell. *Anaerobe* 7, 297-306 (2001).
(14) Liu, H. & Logan, B. E. Electricity generation using an air-cathode single chamber microbial fuel cell in the presence and absence of a proton exchange membrane. *Environ. Sci. Technol.* 38, 4040-4046 (2004).
(15) Liu, H., Ramnarayanan, R. & Logan, B. E. Production of electricity during wastewater treatment using a single chamber microbial fuel cell. *Environ. Sci. Technol.* 38, 2281-2285 (2004).
(16) H. Cheng, K. Scott, and C. Ramshaw. Intensification of water electrolysis in a centrifugal field. J. Electrochem. Soc. 149, D172-D177 (2002)
(17) Oh, S. E., Min, B. and Logan, B. E. Cathode performance as a factor in electricity generation in microbial fuel cells. *Environ. Sci. Technol.* 38, 4900-4904 (2004).
(18) Kim, J. R. Min, B. & Logan, B. E. Evaluation of Procedures to Acclimate a Microbial Fuel Cell for Electricity Production. *Appl. Microbiol Biotechnol.*
(19) Logan, B. E., Oh, S. E., Kim, I. S. & Van Ginkel, S. Biological hydrogen production measured in batch anaerobic respirometers. *Environ. Sci. Technol.* 36, 2530-2535 (2002).
(20) Cheng, S.; Liu, H.; Logan, B. E. Optimization of air cathode used in one-chamber microbial fuel cells. Extended Abstract, Proc. 228th American Chemical Society Annual Meeting. CD ROM.
(21) Min, B. & Logan, B. E. Continuous electricity generation from domestic wastewater and organic substrates in a flat plate microbial fuel cell. *Environ. Sci. Technol.* 38, 5809-5814 (2004).
(22) Logan, B. E., Murano, C. Scott, K. Gray N. D. and Head, I. M. Electricity generation from cysteine in a microbial fuel cell. *Wat. Res.* 39, 942-952 (2005).
(23) Min, Booki. 2005. Perchlorate remediation using packed-bed bioreactors and electricity generation in microbial fuel cells (MFCs). Ph.D. dissertation, Penn State University, University Park, Pa.
101) Chauduri, S. K., and Lovely, D. R., Nat. Biotechnol., 21:1229-1232, 2003.
102) Park, D. H. and Zeikus, J. G., Appl. Microbiol. Biotechnol., 59:58-61, 2002.
103) Kim, N. et al., Biotechnol. Bioeng., 70:109-114, 2000.
104) Park, D. H. and Zeikus, J. G., Appl. Environ. Microbiol., 66, 1292-1297, 2000.
105) Pham, C. A. et al., Enzyme Microb. Technol., 30: 145-152, 2003.

Any patents or publications mentioned in this specification are incorporated herein by reference to the same extent as if each individual publication is specifically and individually indicated to be incorporated by reference. In particular, this application claims priority of U.S. Provisional Patent Application 60/588,022, filed Jul. 14, 2004, and U.S. Provisional Patent Application 60/608,703, filed Sep. 10, 2004, each of which is incorporated herein by reference in its entirety.

The compositions and methods described herein are presently representative of preferred embodiments, exemplary, and not intended as limitations on the scope of the invention. Changes therein and other uses will occur to those skilled in the art. Such changes and other uses can be made without departing from the scope of the invention as set forth in the claims.

We claim:

1. A system for producing hydrogen comprising:
a reaction chamber having a wall defining an interior of the reaction chamber and an exterior of the reaction chamber;
an anode at least partially contained within the interior of the reaction chamber;
a cathode at least partially contained within the interior of the reaction chamber, the cathode spaced apart at a distance in the range between 0.1-100 centimeters, inclusive, from the anode;
a conductive conduit for electrons in electrical communication with the anode and the cathode;
an electricity producing microbial fuel cell in electrical communication with the anode and cathode to enhance an electrical potential between the anode and cathode; and
a first channel defining a passage from the exterior of the reaction chamber to the interior of the reaction chamber.

2. A system for producing hydrogen, comprising:
a reaction chamber having a wall defining an interior of the reaction chamber and an exterior of the reaction chamber;
an anode at least partially contained within the interior of the reaction chamber;
a cathode assembly comprising: a gas porous support for an electrically conductive cathode material, the gas porous support forming a cathode wall generally enclosing and defining an interior space, the cathode wall having an internal surface adjacent the interior space and an opposed external surface, the wall extending between a first end and a second end; and an electrically conductive cathode material is disposed in contact with the cathode wall, the cathode assembly at least partially contained within the interior of the reaction chamber;

a conductive conduit for electrons in electrical communication with the anode and the electrically conductive cathode material;

an electricity producing microbial fuel cell in electrical communication with the anode and the electrically conductive cathode material to enhance an electrical potential between the anode and the electrically conductive cathode material; and a first channel defining a passage from the exterior of the reaction chamber to the interior of the reaction chamber.

3. The system of claim 2 further comprising a cathode protective layer in contact with the cathode.

4. The system of claim 3 wherein the cathode protective layer is a cathode diffusion layer.

5. The system of claim 4 wherein the cathode diffusion layer comprises a hydrophobic hydrogen permeable polymer material.

6. The system of claim 2 further comprising a proton exchange membrane interposed between the anode and the cathode.

7. The system of claim 2 further comprising a filter interposed between the anode and the cathode.

8. The system of claim 2 wherein the anode is porous to a liquid containing an organic substrate for anodophilic bacteria.

9. The system of claim 8 wherein the first channel, the anode and the cathode are positioned such that a liquid containing an organic substrate for anodophilic bacteria introduced into the interior of the reaction chamber through the first channel passes through the anode prior to reaching the cathode.

10. The system of claim 2 wherein the anode and the cathode each have a longest dimension, and the anode and the cathode are positioned such that the longest dimension of the anode is at an angle in the range between 0 and 180 degrees, inclusive with respect to the longest dimension of the cathode.

11. The system of claim 2 wherein the wall comprises a support structure for supporting an anode in contact with the support structure.

12. The system of claim 2 wherein the wall comprises a support structure for supporting a cathode in contact with the support structure.

13. The system of claim 12 wherein the support for a cathode is porous to hydrogen.

14. The system of claim 2 wherein the wall includes a structural portion and an electrode portion, the structural portion and the electrode portion in combination defining the interior of the reaction chamber.

15. The system of claim 2 wherein the cathode is a gas cathode having an inner cathode surface disposed in the interior of the reaction chamber and an outer cathode surface disposed exterior to the reaction chamber.

16. The system of claim 15 further comprising a cathode diffusion layer disposed on the outer surface of the cathode.

17. The system of claim 2 further comprising a hydrogen collection system.

18. The system of claim 2 wherein the anode has a total surface area and the interior of the reaction chamber has a total volume, wherein a ratio of the total surface area of the anode to the total volume of the interior of the reaction chamber is in the range of 1000:1-1:1 square meters per cubic meter, inclusive.

19. The system of claim 2 comprising a cathode protective layer disposed in the interior of the reaction chamber and not in contact with the cathode.

20. The system of claim 19 wherein the cathode protective layer comprises an anion exchange material.

21. The system of claim 20 wherein the anion exchange material is an anion exchange membrane.

22. A process for producing hydrogen, comprising:
providing a system for producing hydrogen according to claim 2, the system comprising a reactor having an interior;
providing anodophilic bacteria disposed within the interior of the reactor;
introducing an organic material oxidizable by an oxidizing activity of the anodophilic bacteria;
incubating the organic material oxidizable by the anodophilic bacteria under oxidizing reactions conditions such that electrons are produced and transferred to the anode;
activating a power source to increase a potential between the anode and the cathode, such that electrons and protons combine to produce hydrogen gas.

23. The process of claim 22 wherein the activation of the power source includes application of a voltage in the range of 25-1600 millivolts.

24. The process of claim 22 wherein the incubating the organic material oxidizable by the anodophilic bacteria under oxidizing reactions conditions comprises incubation at an ambient temperature in the range of 15-24° C., inclusive.

25. The process of claim 22 wherein the incubating the organic material oxidizable by the anodophilic bacteria under oxidizing reactions conditions comprises incubation in a medium having an ionic strength in the range of 50-500 millimolar.

26. The process of claim 22 wherein the incubating the organic material oxidizable by the anodophilic bacteria under oxidizing reactions conditions comprises maintenance of substantially anaerobic conditions.

* * * * *

UNITED STATES PATENT AND TRADEMARK OFFICE
CERTIFICATE OF CORRECTION

PATENT NO.       : 7,709,113 B2
APPLICATION NO.  : 12/360708
DATED            : May 4, 2010
INVENTOR(S)      : Bruce Logan et al.

Page 1 of 1

It is certified that error appears in the above-identified patent and that said Letters Patent is hereby corrected as shown below:

Column 1, lines 16-21: should read

~~Research carried out in connection with this~~ This invention was ~~supported in part by National Science Foundation grant BES-0401885 and~~ made with government support under Grant No. BES0401885, awarded by the National Science Foundation and Grant No. 68-3A75-3-150, awarded by the United States Department of Agriculture. ~~Grant 68-3-A75-3-150. Accordingly, the United States government may have~~ The Government has certain rights in the invention.

Signed and Sealed this
Thirty-first Day of May, 2011

David J. Kappos
*Director of the United States Patent and Trademark Office*